US011086290B2

(12) United States Patent
Yoon et al.

(10) Patent No.: US 11,086,290 B2
(45) Date of Patent: Aug. 10, 2021

(54) ELECTRONIC APPARATUS FOR MONITORING STATE OF MACHINE TOOL AND CONTROL METHOD THEREOF

(71) Applicant: Samsung Electronics Co., Ltd., Gyeonggi-do (KR)

(72) Inventors: Seok-Ho Yoon, Seoul (KR); Jae-Seok Park, Seoul (KR)

(73) Assignee: Samsung Electronics Co., Ltd

( * ) Notice: Subject to any disclaimer, the term of this patent is extended or adjusted under 35 U.S.C. 154(b) by 56 days.

(21) Appl. No.: 16/343,183

(22) PCT Filed: Oct. 16, 2017

(86) PCT No.: PCT/KR2017/011418
§ 371 (c)(1),
(2) Date: Apr. 18, 2019

(87) PCT Pub. No.: WO2018/074799
PCT Pub. Date: Apr. 26, 2018

(65) Prior Publication Data
US 2019/0243333 A1  Aug. 8, 2019

(30) Foreign Application Priority Data
Oct. 18, 2016 (KR) .................. 10-2016-0134832

(51) Int. Cl.
*G05B 19/4065* (2006.01)
*B23Q 17/00* (2006.01)
(Continued)

(52) U.S. Cl.
CPC ......... *G05B 19/4065* (2013.01); *B23Q 17/00* (2013.01); *G05B 19/418* (2013.01);
(Continued)

(58) Field of Classification Search
CPC .............. G05B 19/4065; G05B 19/418; G05B 19/4145; G05B 23/02; G05B 23/0267; B23Q 17/00; Y02P 90/02
See application file for complete search history.

(56) References Cited

U.S. PATENT DOCUMENTS 9,043,402 B2 * 5/2015 Fosburgh ............ G06F 11/3055
709/205
2004/0174130 A1 * 9/2004 Inoue ...................... B23Q 17/09
318/569
(Continued)

FOREIGN PATENT DOCUMENTS

JP          2004295348       10/2004
JP          2009116420        5/2009
(Continued)

OTHER PUBLICATIONS

PCT/ISA/210 Search Report issued on PCT/KR2017/011418, pp. 5.
PCT/ISA/237 Written Opinion issued on PCT/KR2017/011418, pp. 6.

*Primary Examiner* — Thomas C Lee
*Assistant Examiner* — Anzuman Sharmin
(74) *Attorney, Agent, or Firm* — The Farrell Law Firm, P.C.

(57) ABSTRACT

According to various embodiments, an electronic apparatus may comprise: a communication circuit; at least one sensor for detecting first sensing information related to a state of at least one machine tool connected to the electronic apparatus; and a processor configured to transmit the detected first sensing information to a server, receive, from the server, reference information acquired on the basis of the first sensing information and second sensing information related to a state of at least one external machine tool connected to at least one external electronic apparatus, and determine the state related to the at least one machine tool on the basis of (Continued)

the received reference information. Various embodiments are possible.

11 Claims, 19 Drawing Sheets

(51) Int. Cl.
  *G05B 19/418* (2006.01)
  *G05B 19/414* (2006.01)
  *G05B 23/02* (2006.01)
(52) U.S. Cl.
  CPC ......... *G05B 19/4145* (2013.01); *G05B 23/02* (2013.01); *Y02P 90/02* (2015.11)

(56) References Cited

U.S. PATENT DOCUMENTS

| | | | |
|---|---|---|---|
| 2013/0253670 A1 | 9/2013 | Chung et al. | |
| 2016/0258749 A1* | 9/2016 | MacGougan | G01S 19/45 |
| 2016/0299492 A1* | 10/2016 | Qi | H04L 67/12 |
| 2016/0349737 A1* | 12/2016 | Yen | G05B 19/4065 |
| 2017/0372601 A1* | 12/2017 | Yamashita | G08C 25/00 |

FOREIGN PATENT DOCUMENTS

| | | | |
|---|---|---|---|
| JP | 2011186910 | | 9/2011 |
| KR | 1020120064321 | | 6/2012 |
| KR | 101257275 | | 4/2013 |
| KR | 1020140010317 | | 1/2014 |
| KR | 1020150072896 | | 6/2015 |
| KR | 101626458 | B1 * | 6/2016 |
| KR | 1020160119552 | | 10/2016 |

\* cited by examiner

ELECTRONIC APPARATUS FOR MONITORING STATE OF MACHINE TOOL AND CONTROL METHOD THEREOF

TECHNICAL FIELD

The present disclosure relates to an electronic device, and more particularly, to an electronic device for monitoring a state of at least one machine tool respectively connected to a plurality of electronic devices and a control method of the electronic device.

BACKGROUND ART

Generally, when a work is not processed normally during precise processing using a computer numerical control (CNC) machine tool, this situation is the result of a failure, damage, etc., in the CNC machine tool or consumables used therein.

A tool condition system as a representative example may collect sensor data by using a sensor such as acoustic emission (AE) and analyze the collected sensor data by comparing the same with data of a normal tool and data of an abnormal (damaged or abraded) tool, thus sensing a tool state change and replacing the existing tool with new one at the right time.

DETAILED DESCRIPTION OF THE INVENTION

Technical Problem

Related techniques mostly assume a situation in which one or a few CNC machine tools are managed and the detection method or detection model, etc., does not often change. However, for mass production of products, several hundreds, thousands, or tens of thousands of CNC machine tools have to be managed and various products and processes may not be simultaneously handled.

Moreover, recently, a system has been developed which is capable of sensing a failure or damage before or after occurrence thereof by analyzing sensor data collected using various sensors sensing states of CNC machine tools and consumables thereof.

Various embodiments of the present disclosure provide an electronic device for monitoring the state of a machine tool and a control method of the electronic device in which a part for making a decision regarding the state by analyzing sensor data in real time to monitor states of the machine tool and a consumable thereof in real time and a part for periodically generating a model for state monitoring and optimizing a setting value may be separated and efficiently controlled.

Various embodiments of the present disclosure also provide an electronic device for monitoring the state of a machine tool and a control method of the electronic device in which the process of making a decision regarding a state, the process of generating a model, and the process of optimizing a setting value may be processed at a time by simultaneously collecting sensor data for monitoring states of a machine tool and a consumable thereof.

Technical Solution

According to various embodiments, an electronic device includes a communication circuit, at least one sensor configured to detect first sensing information related to a state of at least one machine tool connected to the electronic device, and a processor configured to transmit the detected first sensing information to a server, receive from the server, reference information obtained based on the first sensing information and second sensing information related to the state of at least one external machine tool connected to at least one external electronic device, and determine the state related to the at least one machine tool based on the received reference information.

According to various embodiments, a method for monitoring the state of a machine tool in an electronic device includes detecting first sensing information related to a state of at least one machine tool connected to the electronic device, transmitting the detected first sensing information to a server, receiving, from the server, reference information obtained based on the detected first sensing information and second sensing information related to the state of at least one external machine tool connected to at least one external electronic device, and determining the state related to the at least one machine tool based on the received reference information.

According to various embodiments, an electronic device includes a communication circuit configured to communicate with a plurality of external electronic devices and a processor configured to respectively receive, from the plurality of external electronic devices, sensing information related to the state of at least one machine tool respectively connected to the plurality of external electronic devices, generate reference information for determining the state related to the at least one machine tool respectively connected to the plurality of external electronic devices based on the respectively received sensing information, and respectively transmit the generated reference information to the plurality of external electronic devices.

Advantageous Effects

According to various embodiments, value control information for determining states of a plurality of machine tools may be obtained at a time for analysis and processing, thereby shortening learning and analyzing/processing time for generating reference information for determining the state of the machine tool while generating the reference information using a large volume of information, and thus improving the accuracy of the determination of the state of the machine tool.

Moreover, according to various embodiments, the reference information for determining the state of the machine tool may be periodically changed or updated based on the value control information of the machine tool, which may change frequently according to characteristics of a work and processing, thereby further improving the accuracy of determination of the state of the machine tool.

MODE FOR CARRYING OUT THE INVENTION

Figure 1:
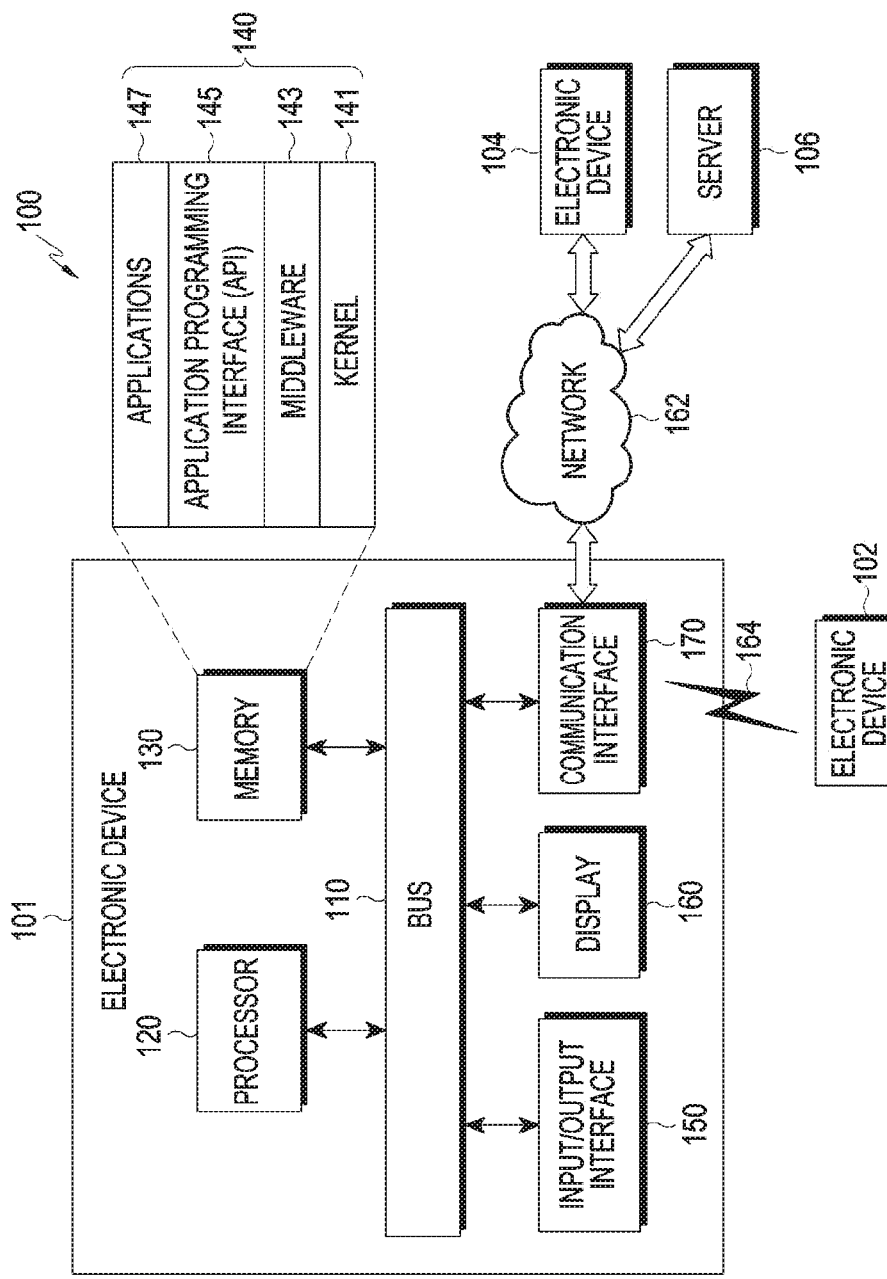
FIG. 1 illustrates an electronic device in a network environment according to various embodiments.

Hereinafter, various embodiments of the present disclosure will be disclosed with reference to the accompanying drawings. However, embodiments and terms used therein are not intended to limit the present disclosure to particular embodiments, and it should be construed as including various modifications, equivalents, and/or alternatives according to the embodiments of the present disclosure. With regard to the description of the drawings, similar reference numerals may be used to refer to similar or related elements. It is to be understood that a singular form of a noun corresponding to an item may include one or more of the things, unless the relevant context clearly indicates otherwise. In the present disclosure, an expression such as "A or B," "at least one of A or/and B," or "one or more of A or/and B" may include all possible combinations of together listed items. Expressions such as "first," "second," "primarily," or "secondary," used herein may represent various elements regardless of order and/or importance and do not limit corresponding elements. When it is described that an element (such as a first element) is "operatively or communicatively coupled with/to" or "connected" to another element (such as a second element), the element can be directly connected to the other element or can be connected to the other element through another element (e.g., a third element).

An expression "configured to (or set)" used in the present disclosure may be replaced with, for example, "suitable for," "having the capacity to," "adapted to," "made to," "capable of," or "designed to" according to a situation. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that can perform a corresponding operation by executing at least one software program stored at a memory device.

An electronic device according to various embodiments of the present disclosure may include at least one of, for example, a smartphone, a tablet personal computer (PC), a mobile phone, a video phone, an electronic-book (e-book) reader, a desktop PC, a laptop PC, a netbook computer, a workstation, a server, a personal digital assistant (PDA), a portable multimedia player (PMP), an MP3 player, a mobile medical equipment, a camera, and a wearable device. Examples of the wearable device may include at least one of an accessory type (e.g., a watch, a ring, a bracelet, an anklet, a necklace, glasses, contact lenses, head-mounted device (HMD), etc.), a fabric or cloth-integrated type (e.g., electronic clothing, etc.), a body-attached type (e.g., a skin pad, a tattoo, etc.), a body implanted type (e.g., an implantable circuit, etc.), and so forth. In some embodiments, the electronic device may include, for example, a television (TV), a digital video disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., Samsung HomeSync™, Apple TV™, or Google TV™), a game console, an electronic dictionary, an electronic key, a camcorder, and an electronic frame.

In other embodiments, the electronic device may include at least one of various medical equipment (for example, magnetic resonance angiography (MRA), magnetic resonance imaging (MRI), computed tomography (CT), an imaging device, or an ultrasonic device), a navigation system, a global positioning system (GPS) receiver, an event data recorder (EDR), a flight data recorder (FDR), a vehicle infotainment device, electronic equipment for ships (e.g., a navigation system and gyro compass for ships), avionics, a security device, a vehicle head unit, an industrial or home robot, an automatic teller's machine (ATM), a point of sales (POS), Internet of things (e.g., electric bulbs, various sensors, electricity or gas meters, sprinkler devices, fire alarm devices, thermostats, streetlights, toasters, exercise machines, hot-water tanks, heaters, boilers, and so forth). According to some embodiments, the electronic device may include a part of a furniture, building/structure or a part of a vehicle, an electronic board, an electronic signature receiving device, a projector, and various measuring instruments (e.g., a water, electricity, gas, electric wave measuring device, etc.). According to various embodiments, the electronic device may be flexible or may be a combination of two or more of the above-described various devices. According to an embodiment of the disclosure, the electronic devices are not limited to those described above. Herein, the term "user" used in various embodiments of the present disclosure may refer to a person who uses the electronic device or a device using the electronic device (e.g., an artificial intelligence electronic device).

Referring to FIG. 1, an electronic device 101 in a network environment 100 according to various embodiments of the present disclosure is disclosed. The electronic device 101 may include a bus 110, a processor 120, a memory 130, an input/output (I/O) interface 150, a display 160, and a communication interface 170. According to some embodiments, the electronic device 101 may omit at least one of the foregoing elements or may further include other elements. The bus 110 may include a circuit for connecting, e.g., the elements 110 to 2170 and delivering communication (e.g., a control message or data) between the elements 110 to 170. The processor 120 may include one or more of a central processing unit (CPU), an application processor (AP), and a communication processor (CP). The processor 120 performs operations or data processing for control and/or communication of, for example, at least one other elements of the electronic device 101.

The memory 130 may include a volatile and/or nonvolatile memory. The memory 130 may store, for example, instructions or data associated with at least one other elements of the electronic device 101. According to an embodiment of the present disclosure, the memory 130 may store software and/or a program 140. The program 140 may include at least one of, for example, a kernel 141, middleware 143, an application programming interface (API) 145, and/or an application program (or "application") 147, and the like. At least some of the kernel 141, the middleware 143, and the API 145 may be referred to as an operating system (OS). The kernel 141 may control or manage, for example, system resources (e.g., the bus 110, the processor 120, the memory 130, etc.) used to execute operations or functions implemented in other programs (e.g., the middleware 143, the API 145, or the application program 147). The kernel 141 provides an interface through which the middleware 143, the API 145, or the application program 147 accesses separate components of the electronic device 101 to control or manage the system resources.

The middleware 143 may work as an intermediary for allowing, for example, the API 145 or the application program 147 to exchange data in communication with the kernel 141. In addition, the middleware 143 may process one or more task requests received from the application program 147 based on priorities. For example, the middleware 143 may give a priority for using a system resource (e.g., the bus 110, the processor 120, the memory 130, etc.) of the electronic device 101 to at least one of the application programs 147, and may process the one or more task requests. The API 145 is an interface used for the application 147 to control a function provided by the kernel 141 or the middleware 143, and may include, for example, at least one interface or function (e.g., an instruction) for file control, window control, image processing or character control. The I/O interface 150 may deliver, for example, an instruction or data input from a user or another external device to other component(s) of the electronic device 101, or output an instruction or data received from other component(s) of the electronic device 101 to a user or another external device.

The display 160 may include, for example, a liquid crystal display (LCD), a light emitting diode (LED) display, an organic light emitting diode (OLED) display, a microelectromechanical system (MEMS) display, or an electronic paper display. The display 160 may, for example, display various contents (e.g., a text, an image, video, an icon, and/or a symbol, etc.) to users. The display 160 may include a touch screen, and receives a touch, a gesture, proximity, or a hovering input, for example, by using an electronic pen or a part of a body of a user. The communication interface 170 establishes communication between the electronic device 101 and an external device (e.g., a first external electronic device 102, a second external electronic device 104, or a server 106). For example, the communication interface 170 may be connected to a network 162 through wireless communication or wired communication to communicate with an external device (e.g., the second external electronic device 104 or the server 106).

The wireless communication may include cellular communication using at least one of Long-Term Evolution (LTE), LTE-Advanced (LTE-A), Code Division Multiple Access (CDMA), Wideband CDMA (WCDMA), a Universal Mobile Telecommunication System (UMTS), Wireless Broadband (WiBro), or Global System for Mobile Communications (GSM)). According to an embodiment, the wireless communication may include at least one of Wireless Fidelity (WiFi), Bluetooth, Bluetooth Low Energy (BLE), Zigbee, near field communication (NFC), magnetic secure transmission (MST), radio frequency (RF), and a body area network (BAN). According to an embodiment, the wireless communication may include GNSS. The GNSS may include, for example, at least one of a global positioning system (GPS), a global navigation satellite system (Glonass), a Beidou navigation satellite system ("Beidou"), and Galileo, the European global satellite-based navigation system. Hereinbelow, "GPS" may be used interchangeably with "GNSS". The wired communication may include, for example, at least one of universal serial bus (USB), high definition multimedia interface (HDMI), recommended standard 232 (RS-232), power line communication, and plain old telephone service (POTS). The network 162 may include a telecommunications network, for example, at least one of a computer network (e.g., a local area network (LAN) or a wide area network (WAN)), Internet, and a telephone network.

Each of the first external electronic device 102 and the second external electronic device 104 may be a device of the same type as or a different type than the electronic device 101. According to various embodiments of the present disclosure, some or all of operations performed by the electronic device 101 may be performed in another electronic device or a plurality of electronic devices (e.g., the electronic device 102 or 104, or the server 106). According to an embodiment of the present disclosure, when the electronic device 101 has to perform a function or a service automatically or at a request, the electronic device 101 may request another device (e.g., the electronic devices 102 or 104 or the server 106) to perform at least some functions associated with the function or the service instead of or in addition to executing the function or the service. The another electronic device (e.g., the electronic device 102 or 104 or the server 106) may execute the requested function or additional function and deliver the execution result to the electronic device 101. The electronic device 101 may then process or further process the received result to provide the requested function or service. To that end, a cloud computing, distributed computing, or client-server computing technology may be used, for example.

Figure 2:
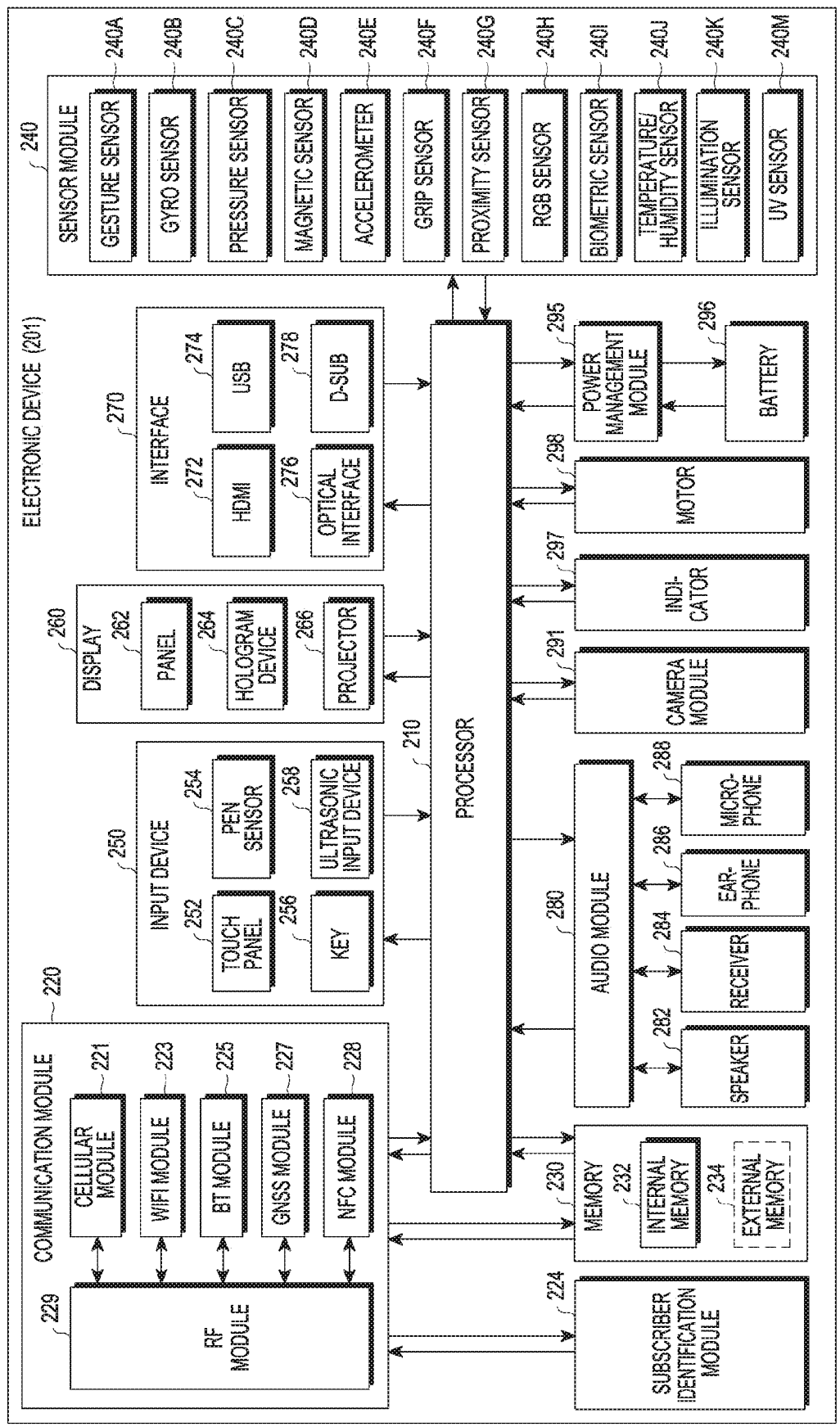
FIG. 2 is a block diagram of an electronic device according to various embodiments.

FIG. 2 is a block diagram of an electronic device 201 according to various embodiments of the present disclosure. The electronic device 201 may form the entire electronic device 101 illustrated in FIG. 1 or a part of the electronic device 101 illustrated in FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 controls multiple hardware or software components connected to the processor 210 by driving an operating system (OS) or an application program, and performs processing and operations with respect to various data. The processor 210 may be implemented with, for example, a system on chip (SoC). According to an embodiment of the present disclosure, the server 210 may include a graphic processing unit (GPU) and/or an image signal processor. The processor 210 may include at least some of the elements illustrated in FIG. 2 (e.g., the cellular module 221). The processor 210 loads an instruction or data received from at least one of other elements (e.g., a non-volatile memory) into a volatile memory to process the instruction or data, and stores result data in the non-volatile memory.

The communication module 220 may have a configuration that is the same as or similar to the communication interface 170. The communication module 220 may include, for example, the cellular module 221, a WiFi module 223, a Bluetooth (BT) module 225, a GNSS module 227, a near field communication (NFC) module 228, and a radio frequency (RF) module 229. The cellular module 221 may provide, for example, a voice call, a video call, a text service, or an Internet service over a communication network. According to an embodiment, the cellular module 221 identifies and authenticates the electronic device 201 in a communication network by using the SIM 224 (e.g., a SIM card). According to an embodiment, the cellular module 221 may perform at least one of functions that may be provided by the processor 210. According to an embodiment, the cellular module 221 may include a communication processor (CP). According to an embodiment, at least some (e.g., two or more) of the cellular module 221, the WiFi module 223, the BT module 225, the GNSS module 227, and the NFC module 228 may be included in one integrated chip (IC) or IC package. The RF module 229 may, for example, transmit and receive a communication signal (e.g., an RF signal). The RF module 229 may include a transceiver, a power amp module (PAM), a frequency filter, a low noise amplifier (LNA), or an antenna. According to another embodiment, at least one of the cellular module 221, the WiFi module 223, the BT module 225, the GNSS module 227, and the NFC module 228 may transmit and receive an RF signal through the separate RF module. The SIM 224 may, for example, include a card including a SIM or an embedded SIM, and may include unique identification information (e.g., an integrated circuit card identifier (ICCID) or subscriber information (e.g., an international mobile subscriber identity (IMSI)).

The memory 230 (e.g., the memory 130) may, for example, include an internal memory 232 and/or an external memory 234. The internal memory 232 may, for example, include at least one of a volatile memory (e.g., dynamic random-access memory (DRAM), static RAM (SRAM), synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, a flash memory, and a solid-state drive (SSD). The external memory 23b may further include flash drive, for example, compact flash (CF), secure digital (SD), micro-SD, mini-SD, extreme Digital (xD), a multi-media card (MMC), or a memory stick. The external memory 234 may be functionally or physically connected with the electronic device 201 through various interfaces.

The sensor module 240 measures physical quantity or senses an operation state of the electronic device 201 to convert the measured or sensed information into an electric signal. The sensor module 240 may, for example, include at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., RGB sensor), a biometric sensor 240I, a temperature/humidity sensor 240J, an illumination sensor 240K, and a ultraviolet (UV) sensor 240M. Additionally or alternatively, the sensor module 240 may include an E-nose sensor (not shown), an electromyography (EMG) sensor (not shown), an electroencephalogram (EEG) sensor (not shown), an electrocardiogram (ECG) sensor (not shown), an infrared (IR) sensor, an iris sensor, and/or a fingerprint sensor. The sensor module 240 may further include a control circuit for controlling at least one sensor included therein. In some embodiment, the electronic device 201 may further include a processor configured to control the sensor module 240 as part of or separately from the processor 210, to control the sensor module 240 during a sleep state of the processor 210.

The input device 250 may include, for example, a touch panel 252, a (digital) pen sensor 254, a key 256, or an ultrasonic input device 258. The touch panel 252 may use at least one of a capacitive type, a resistive type, an IR type, or an ultrasonic type. The touch panel 252 may further include a control circuit. The touch panel 252 may further include a tactile layer to provide tactile reaction to the user. The (digital) pen sensor 254 may include a recognition sheet which is a part of the touch panel 252 or a separate recognition sheet. The key 256 may also include a physical button, an optical key, or a keypad. The ultrasonic input device 258 senses ultrasonic waves generated by an input means through a microphone (e.g., the microphone 288) and checks data corresponding to the sensed ultrasonic waves.

The display 260 (e.g., the display 160) may include a panel 262, a hologram device 264, a projector 266, and/or a control circuit for controlling them. The panel 262 may be implemented to be flexible, transparent, or wearable. The panel 262 may be configured with the touch panel 252 in one module. According to an embodiment, the panel 262 may include a pressure sensor (or a "force sensor", interchangeably used hereinafter) capable of measuring a strength of a pressure by a user's touch. The pressure sensor may be implemented integrally with the touch panel 252 or may be implemented as one or more sensors separate from the touch panel 252. The hologram device 264 may show a stereoscopic image in the air by using interference of light. The projector 266 may display an image onto a screen through projection of light. The screen may be positioned inside or outside the electronic device 201. According to an embodiment, the interface 270 may include a high-definition multimedia interface (HDMI) 272, a universal serial bus (USB) 274, an optical interface 276, or a D-subminiature 278. The interface 270 may be included in the communication interface 170 illustrated in FIG. 1. Additionally or alternatively, the interface 270 may include, for example, a mobile high-definition link (MHL) interface, an SD card/MMC interface, or an infrared data association (IrDA) interface.

The audio module 280 may bi-directionally convert sound and an electric signal. At least one element of the audio module 280 may be included in the input/output interface 145 illustrated in FIG. 1. The audio module 280 may process sound information input or output through the speaker 282, the receiver 284, the earphone 286, or the microphone 288. The camera module 291 is, for example, a device capable of capturing a still image or a moving image, and according to an embodiment, may include one or more image sensors (e.g., a front sensor or a rear sensor), a lens, an image signal processor (ISP), or a flash (e.g., an LED, a xenon lamp, etc.). The power management module 295 manages power of the electronic device 201. According to an embodiment, the power management module 295 may include a power management integrated circuit (PMIC), a charger IC, or a battery fuel gauge. The PMIC may have a wired and/or wireless charging scheme. The wireless charging scheme may include a magnetic-resonance type, a magnetic induction type, and an electromagnetic type, and may further include an additional circuit for wireless charging, for example, a coil loop, a resonance circuit, or a rectifier. The battery gauge may measure the remaining capacity of the battery 296 or the voltage, current, or temperature of the battery 296 during charging. The battery 296 may include, for example, a rechargeable battery and/or a solar battery.

The indicator 297 displays a particular state, for example, a booting state, a message state, or a charging state, of the electronic device 201 or a part thereof (e.g., the processor 210). The motor 298 may convert an electric signal into mechanical vibration or generates vibration or a haptic effect. The electronic device 201 may include a device for supporting the mobile TV (e.g., a GPU) to process media data according to a standard such as digital multimedia broadcasting (DMB), digital video broadcasting (DVB), or mediaFlo™. Each of the foregoing elements described herein may be configured with one or more components, names of which may vary with a type of the electronic device. In various embodiments, some components of the electronic device (e.g., the electronic device 201) may be omitted or may further include other elements, and some of the components may be coupled to form one entity and identically perform functions of the components before being coupled.

Figure 3:
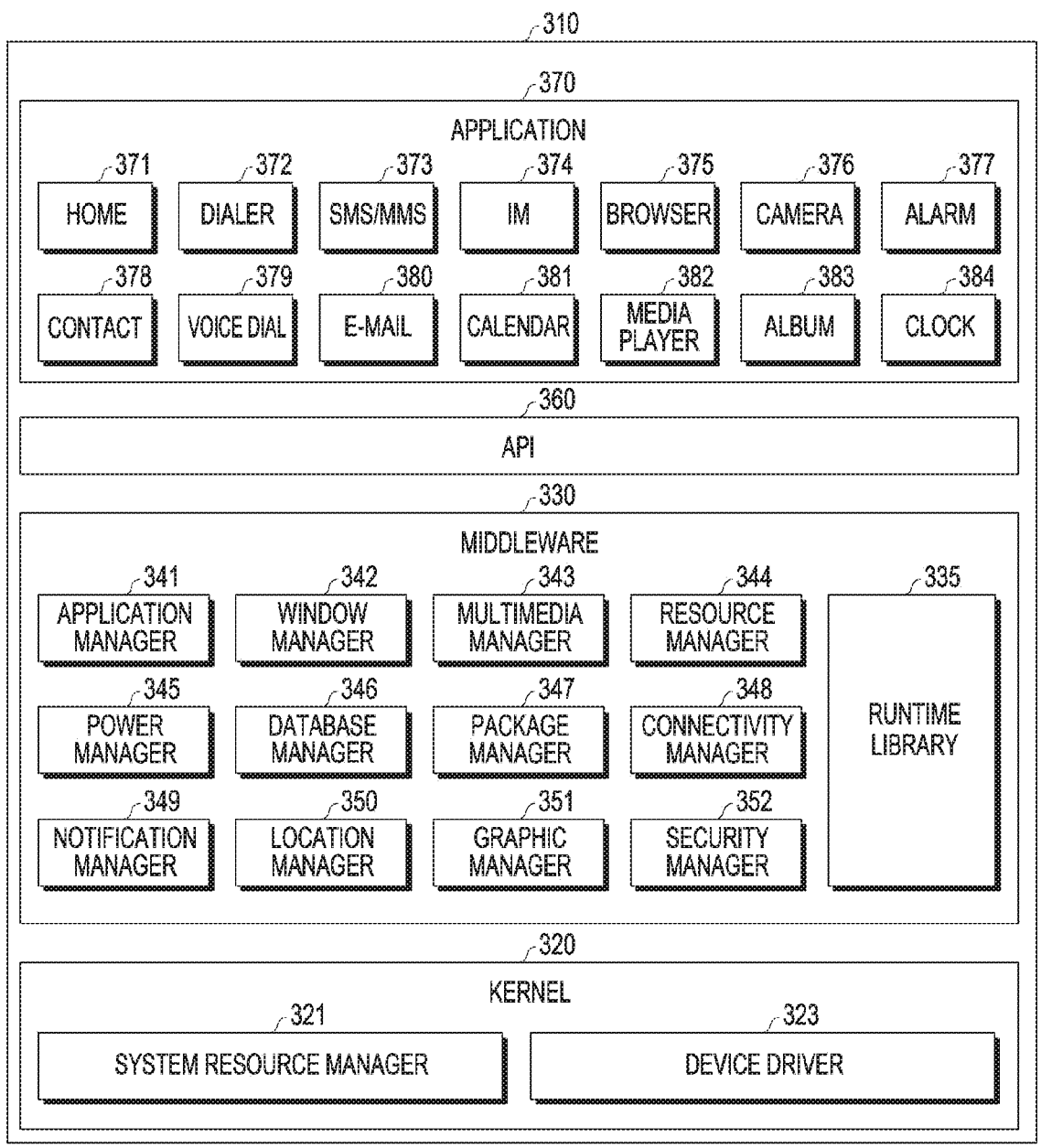
FIG. 3 is a block diagram of a programming module according to various embodiments.

FIG. 3 is a block diagram of a programming module according to various embodiments. According to an embodiment, a programming module 310 (e.g., the program 140) may include an OS for controlling resources associated with an electronic device (e.g., the electronic device 101) and/or various applications (e.g., the application program 147) executed on the OS. The OS may include Android™, iOS™, Windows™ Symbian™, Tizen™, or Bada™. Referring to FIG. 3, the programming module 310 may include a kernel 320 (e.g., the kernel 141), middleware 330 (e.g., the middleware 143), an application programming interface (API) 360 (e.g., the API 145), and/or an application 370 (e.g., the application program 147). At least a part of the programming module 310 may be preloaded on an electronic device or may be downloaded from an external device (e.g., the vehicle device 102, the electronic device 104, or the server 106).

The kernel 320 may include a system resource manager 321 and/or a device driver 323. The system resource manager 321 may perform control, allocation, retrieval of system resources, and so forth. According to an embodiment, the system resource manager 321 may include a process management unit, a memory management unit, or a file system management unit. The device driver 323 may include, for example, a display driver, a camera driver, a Bluetooth driver, a shared memory driver, a USB driver, a keypad driver, a WiFi driver, an audio driver, or an inter-process communication (IPC) driver. The middleware 330 may include provide functions that the application 370 commonly requires or provide various functions to the application 370 through the API 360 to allow the application 370 to use a limited system resource in an electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses to add a new function through a programming language while the application 370 is executed. The runtime library 335 performs input/output management, memory management, or calculation function processing. The application manager 341 manages a life cycle of the applications 370. The window manager 342 manages a graphic user interface (GUI) resource used in a screen. The multimedia manager 343 recognizes a format necessary for playing media files and performs encoding or decoding on a media file by using a codec appropriate for a corresponding format. The resource manager 344 manages a source code or a memory space of the applications 370. The power manager 345 manages a battery or power and provides power information necessary for an operation of the electronic device. According to an embodiment, the power manager 345 may operate with basic input/output system (BIOS). The database manager 346 generates, searches or changes a database used for at least one application among the applications 370. The package manager 347 manages the installation or update of an application distributed in a package file format.

The connectivity manager 348 manages a wireless connection. The notification manager 349 provides an event, e.g., an arriving message, an appointment, proximity notification, etc. The location manager 350 manages location information of an electronic device. The graphic manager 351 manages, for example, a graphic effect to be provided to a user or a user interface relating thereto. The security manager 352 provides, for example, system security or user authentication. According to an embodiment, the middleware 330 may further include a telephony manager for managing a voice or video call function of the electronic device or a middleware module forming a combination of functions of the above-described components. According to an embodiment, the middleware 330 provides a module specified for each type of an OS. Additionally, the middleware 330 may delete some of existing elements or add new elements dynamically. The API 360 may be provided as a set of API programming functions with a different configuration according to the OS. In the case of Android or iOS, for example, one API set may be provided by each platform, and in the case of Tizen, two or more API sets may be provided.

The application 370 may include one or more applications capable of providing a function, for example, a home application 371, a dialer application 372, a short messaging service/multimedia messaging service (SMS/MMS) application 373, an instant message (IM) application 374, a browser application 375, a camera application 376, an alarm application 377, a contact application 378, a voice dial application 379, an e-mail application 380, a calendar application 381, a media player application 382, an album application 383, a clock application 384, a health care application (e.g., an application for measuring an exercise amount, a blood sugar, etc.), or an environment information providing application (e.g., an application for providing air pressure, humidity, or temperature information or the like). According to an embodiment, the application 370 may include an information exchange application supporting information exchange between the electronic device and an external electronic device. The information exchange application may include, for example, a notification relay application for transferring specific information to the external electronic device or a device management application for managing the external electronic device. For example, the notification relay application may deliver notification information generated in another application of the electronic device to an external electronic device or may receive notification information from the external electronic device and provide the notification information to the user. The device management application may manage (e.g., install, remove, or update) a function (e.g., turn on/turn off of an external electronic device itself (or a part thereof) or control of brightness (or resolution) of a display) of an external device communicating with the electronic device, a service provided by an application operating in an external electronic device or provided by the external electronic device (e.g., a call service or a message service). According to an embodiment, the application 370 may include an application (e.g., device health care application of mobile medical equipment) designated according to an attribute of the external electronic device. According to an embodiment, the application 370 may include an application received from the external electronic device. The at least a part of the programming module 310 may be implemented (e.g., executed) by software, firmware, hardware (e.g., the processor 210), or a combination of two or more of them, and may include, for example, modules, programs, routines, sets of instructions, or processes for performing one or more functions.

Figure 4A:
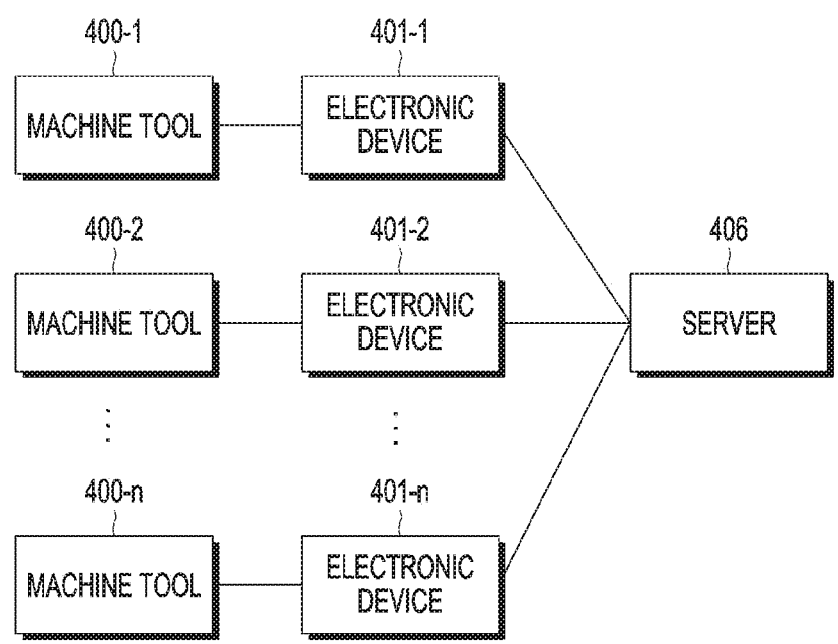
FIGS. 4A and 4B are block diagrams of a system for monitoring a state of a machine tool according to various embodiments.
Figure 4B:
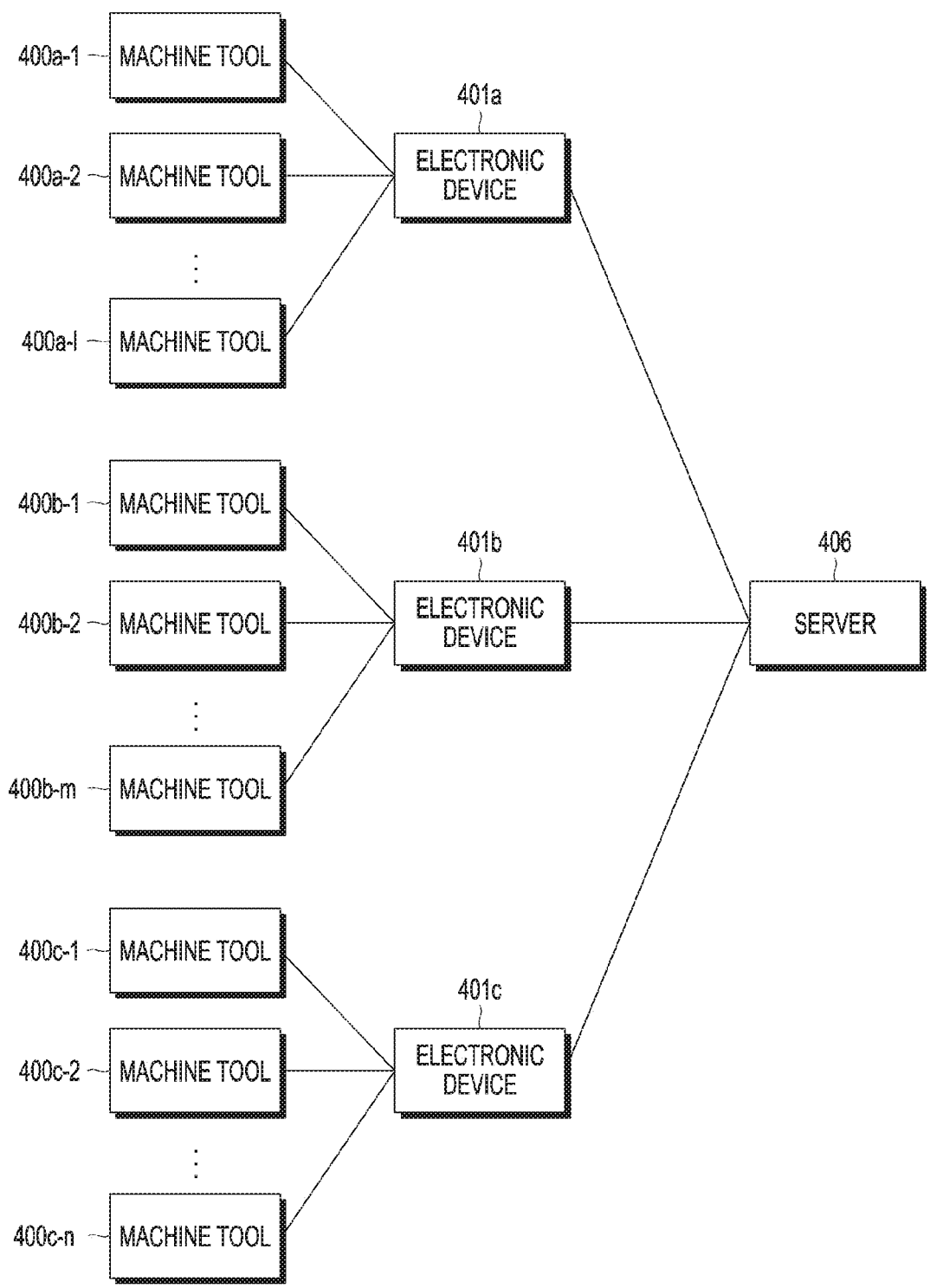

FIGS. 4A and 4B are block diagrams of a system for monitoring the state of a machine tool according to various embodiments.

Referring to FIGS. 4A and 4B, the system may include a plurality of electronic devices 401-1 through 401-*n*, 401*a*, 401*b*, and 401*c* to which at least one machine tools 400-1 through 400-*n*, 400*a*-1 through 400*a*-I, 400*b*-1 through 400*b*-*m*, or 400*c*-1 through 400*c*-*n* are respectively connected, and a server 406. The plurality of electronic devices 401-1 through 401-*n*, 401*a*, 401*b*, and 401*c* may include the entire electronic device 101 illustrated in FIG. 1 or a part thereof or the entire electronic device 201 illustrated in FIG. 2 or a part thereof, and the server 406 may include the entire server 106 illustrated in FIG. 1 or a part thereof.

To the plurality of electronic devices 401-1 through 401-*n*, 401*a*, 401*b*, and 401*c*, the at least one machine tools 400-1 through 400-*n*, 400*a*-1 through 400*a*-I, 400*b*-1 through 400*b*-*m*, or 400*c*-1 through 400*c*-*n* may be electrically or wirelessly respectively connected, and the plurality of electronic devices 401-1 through 401-*n*, 401*a*, 401*b*, and 401*c* may wirelessly communicate with the server 406. The plurality of electronic devices 401-1 through 401-*n*, 401*a*, 401*b*, and 401*c* and the at least one machine tools 400-1 through 400-*n*, 400*a*-1 through 400*a*-I, 400*b*-1 through 400*b*-*m*, or 400*c*-1 through 400*c*-*n* may be connected in various manners.

Referring to FIG. 4A, in the system, the machine tools 400-1, 400-2, or 400-*n* may be one-to-one connected to the plurality of electronic devices 401-1 through 401-*n*, respectively. In FIG. 4A, the machine tools 400-1, 400-2, or 400-*n* may be of the same type and may simultaneously or separately perform the same processing job.

The plurality of electronic devices 401-1 through 401-*n* may detect information related to states of the machine tools 400-1, 400-2, and 400-*n*, respectively, to monitor the states of the machine tools 400-1, 400-2, and 400-*n*, respectively. For example, the plurality of electronic devices 401-1 through 401-*n* may detect information related to states of the machine tools 400-1, 400-2, and 400-*n* (hereinafter, referred to as 'sensing information'), respectively, through at least one sensor (not shown) included in the plurality of electronic devices 401-1 through 401-*n*, respectively.

The plurality of electronic devices 401-1 through 401-*n* may transmit the detected sensing information to the server 406, respectively.

The server 406 may receive the sensing information transmitted from each of the plurality of electronic devices 401-1 through 401-*n*, and generate reference information for determining the state of the machine tool 400-1, 400-2, or 400-*n* based on the received sensing information. The server 406 may transmit the generated corresponding reference information to each of the plurality of electronic devices 401-1 through 401-*n*.

The plurality of electronic devices 401-1 through 401-*n* may determine the state of each of the machine tools 400-1, 400-2, and 400-*n* based on the reference information received from the server 406. The plurality of electronic devices 401-1 through 401-*n* may generate feedback information including the result of determining the state of each of the machine tools 400-1, 400-2, and 400-*n* and transmit the feedback information to the server 406.

The server 406 may update previously stored reference information based on the feedback information transmitted from each of the plurality of electronic devices 401-1 through 401-*n*. The server 406 may transmit the updated reference information to each of the plurality of electronic devices 401-1 through 401-*n*.

The plurality of electronic devices 401-1 through 401-*n* may receive the updated reference information from the server 406 and update the previously stored reference information, respectively.

The process of transmitting and receiving the feedback information between the plurality of electronic devices 401-1 through 401-*n* and the server 406 and the process of updating the reference information may be periodically performed, and as these processes are repeated, the reference information for determining the state of the machine tool 400-1, 400-2*n*, or 400-*n* may be organically or periodically updated along with a change of the state of each of the at least one machine tools 400-1, 400-2, and 400-*n* connected to the plurality of electronic devices 401-1 through 401-*n*, respectively.

Referring to FIG. 4B, in the system, a plurality of machine tools 400*a*-1 through 400*a*-I, 400*b*-1 through 400*b*-*m*, and 400*c*-1 through 400*c*-*n* may be connected to the plurality of electronic devices 401*a*, 401*b*, and 401*c*, respectively. In FIG. 4B, the machine tools 400*a*-1 through 400*a*-1, 400*b*-1 through 400*b*-*m*, or 400*c*-1 through 400*c*-*n* may be of the same type and may simultaneously or separately perform the same processing job. The machine tools 400*a*-1 through 400*a*-1, 400*b*-1 through 400*b*-*m*, or 400*c*-1 through 400*c*-*n* may be grouped into different types of machine tools. For example, the machine tools 400*a*-1 through 400*a*-1, 400*b*-1 through 400*b*-*m*, or 400*c*-1 through 400*c*-*n* may be grouped into the plurality of machine tools 400*a*-1 through 400*a*-1 connected to the electronic device 401*a*, the plurality of machine tools 400*b*-1 through 400*b*-*m* connected to the electronic device 401*b*, and the plurality of machine tools 400*c*-1 through 400*c*-*n* connected to the electronic device 401c, and the groups may simultaneously or separately perform different processing jobs. Except when the plurality of machine tools 400a-1 through 400a-1, 400b-1 through 400b-m, or 400c-1 through 400c-n are of a different type for a different group, the type or the sensing range of sensing information detected through at least one sensor included in each of the plurality of electronic devices 401a, 401b, and 401c may vary, and reference information generated by the server 406 based on the sensing information may also vary with the groups, the plurality of electronic devices 401a, 401b, and 401c, and the server 406 illustrated in FIG. 4B perform the same operations as described with reference to FIG. 4A, and thus a detailed description thereof may be replaced with the foregoing description.

Figure 5:
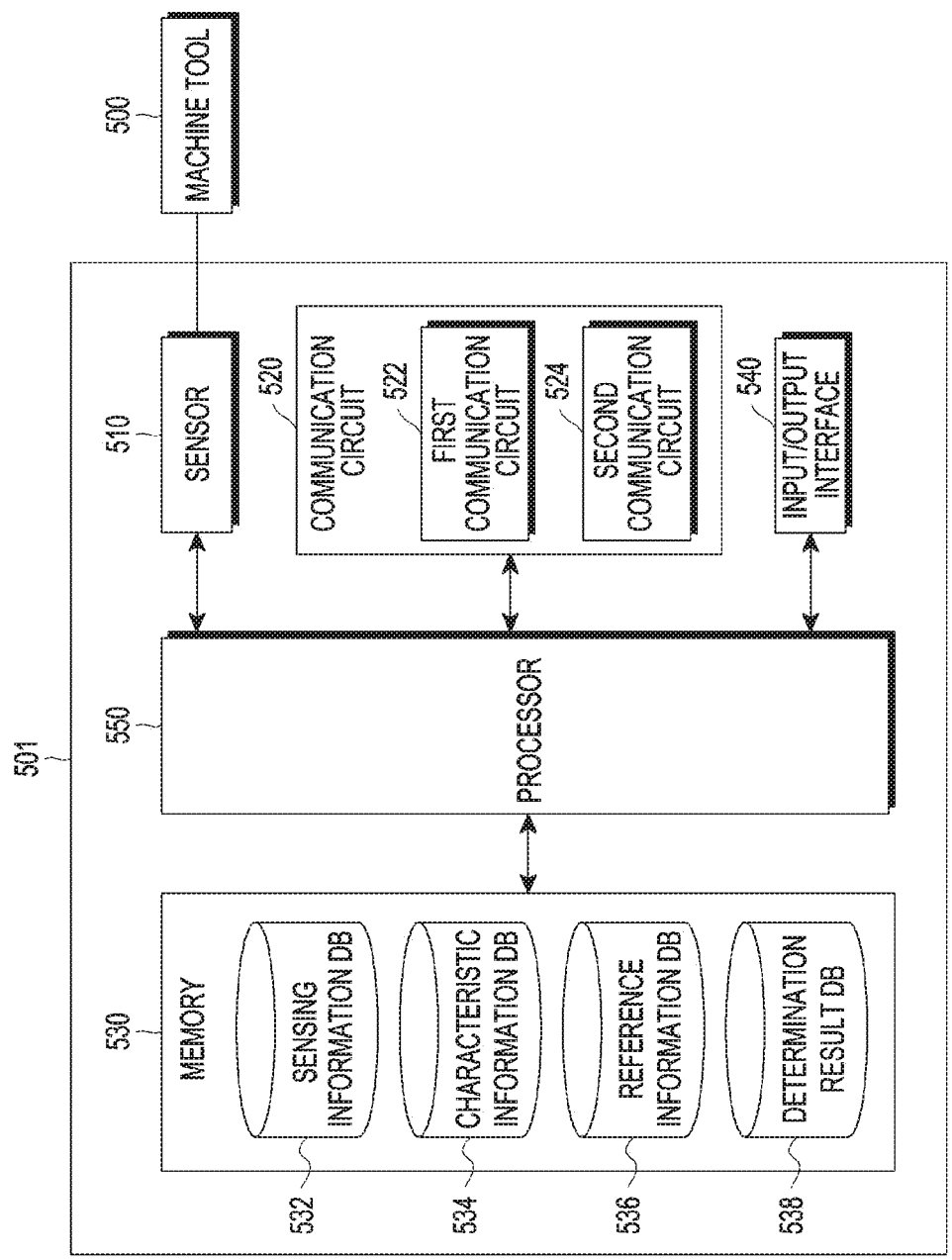
FIG. 5 is a block diagram of an electronic device according to various embodiments.

FIG. 5 is a block diagram of an electronic device according to various embodiments. FIG. 5 illustrates only components related to various embodiments of the present disclosure, and may also include components other than the foregoing or illustrated components. For example, an electronic device 501 illustrated in FIG. 5 may include all components or some components of the electronic devices 401-1 through 401-n, 401a, 401b, or 401c illustrated in FIG. 4. In the present disclosure, to distinguish the electronic device 501 from at least one external electronic device other than the electronic device 501, it is assumed that the electronic device 501 is the electronic device 401a illustrated in FIG. 4B and the at least one external electronic devices are the electronic devices 401b and 401c illustrated in FIG. 4B.

Referring to FIG. 5, the electronic device 501, according to various embodiments, may be a terminal device electrically or wirelessly connected to at least one machine tool 500, and may include at least one of a sensor 510, a communication circuit 520, a memory 530, an input/output interface 540, or a processor 550. The electronic device 500 may determine a state related to the machine tool 500 by periodically or aperiodically monitoring the state related to the machine tool 500. Although it is illustrated in FIG. 5 that one machine tool 500 is connected to the electronic device 501, a plurality of machine tools or a plurality of machine tool groups or a combination thereof may be electrically or wirelessly connected to the electronic device 501, without being limited to the illustration.

The sensor 510 may detect sensing information related to the state of the at least one machine tool 500. In the present disclosure, the sensing information may mean at least one sensing data detected through at least one sensor of an external electronic device to which a machine tool is connected to determine one of a state of the machine tool, a state of a tool or consumable related to the machine tool, or a combination thereof. The sensor 510 may periodically or aperiodically detect the sensing information related to the at least one machine tool 500 under control of the processor 550.

According to an embodiment, the sensor 510 may include a spindle load detector. The spindle load detector may be a sensor for detecting a spindle load generated in the at least one machine tool 500 when a specific job is performed using the at least one machine tool 500.

According to an embodiment, the sensing information may include a spindle load meter (SLM) numerically indicating the degree (the magnitude) of a spindle load detected by the spindle load detector. For example, the SLM may indicate a rate [%] with respect to a maximum power of 100% of a spindle motor of a machine tool. The SLM may have a different value (e.g., a rate [%]) according to the type of the machine tool, the type of tool (e.g., a flat, a ball, a drill, etc.) or consumable (e.g., cutting oil, etc.) related to the machine tool, a processing portion, the type of a processing target (e.g., metal, etc.), the type of a processing method (e.g., cutting, drilling, grinding, polishing, etc.), or a combination thereof.

Although one sensor 510 is illustrated in FIG. 5, various sensors capable of detecting various sensing information related to the state of the at least one machine tool 500 may be provided, without being limited to the illustration.

The communication circuit 520 may include, for example, at least one of a first communication circuit 522 or a second communication circuit 524. The communication circuit 520 may include the entire communication interface 170 illustrated in FIG. 1 or a part thereof or the communication module 220 illustrated in FIG. 2 or a part thereof. The communication circuit 520 may be referred to as a communication unit or a communication module, may include the communication unit or the communication module as a part thereof, or may constitute the communication unit or the communication module.

According to an embodiment, the first communication circuit 522 may provide data based on short-range communication. For example, the communication circuit 520 may communicate with at least one external electronic device (e.g., the electronic device 104 or the server 106 or the server 406) connected to a first network through the first communication circuit 522. For example, the first communication circuit 522 may include at least one of WiFi, BT, NFC, ZigBee, Z-Wave, a global navigation satellite system (GNSS), etc.

According to an embodiment, the second communication circuit 524 may provide a service based on packet data (or an Internet protocol (IP)). For example, the communication circuit 520 may communicate with at least one external electronic device (e.g., the electronic device 104 or the server 106 or the server 406) connected to a second network through the first communication circuit 524. The second communication circuit 524 may include at least one of a computer network (e.g., a LAN or WAN), Internet, or a telephone network.

The communication circuit 520 may perform communication connection with at least one of at least one external electronic device (e.g., the electronic device 401b or the electronic device 401c) or a server (e.g., the server 406) through at least one of the first communication circuit 522 or the second communication circuit 524, and may transmit/receive information to/from at least one of the at least one external electronic device 401b or 401c or the server 406. For example, the information may include at least some of the sensing information related to the state of the at least one machine tool 500 connected to the electronic device 501 in which the sensing information is transmitted to the server 406, the reference information for determining the state of the at least one machine tool 500 periodically or aperiodically received from the server 406, or the feedback information for updating the reference information periodically or aperiodically transmitted to the server 406.

The memory 530 may store instructions or data related to at least one other element of the electronic device 501. The electronic device 530 may include the memory 130 illustrated in FIG. 1 or a part thereof. The memory 530 may include at least one of a sensing information database (DB) 532 in which is stored the sensing information related to the state of the at least one machine tool 500, detected through the sensor 510, a characteristic information DB 534 in which are stored characteristics related to the at least one machine tool 500, a reference information DB 536 in which is stored the reference information for determining the state of the at least one machine tool 500, or a determination result DB 538 in which is stored the result of determining a state related to the at least one machine tool 500.

In the sensing information DB 532 may be stored the sensing information related to the state of the at least one machine tool 500 in which the sensing information is periodically or aperiodically detected through the at least one sensor 510, under control of the processor 550. In the sensing information DB 532, the periodically or aperiodically detected sensing information may be stored in such a way as to be accumulated or updated. In the sensing information DB 532 may be stored sensing information as a database to correspond to the type of the at least one machine tool 500, the type of tool (e.g., a flat, a ball, a drill, etc.) or consumable (e.g., cutting oil, etc.) related to the machine tool, a processing portion, the type of a processing target (e.g., metal, etc.), or the of a processing method (e.g., cutting, drilling, grinding, polishing, etc.).

In the characteristic information DB 534 may be stored at least one of attribute information of the at least one machine tool 500 or a tool or consumable related thereto (e.g., a product name (or an equipment name), a number, a production line number, etc., of a machine tool/tool/consumable) or information related to a job using the at least one machine tool 500 or a tool or consumable related thereto (e.g., a setting value corresponding to characteristics of a machine, a setting value corresponding to characteristics of a job, etc.) as a database. The characteristic information may be stored in advance in the characteristic information DB 534 or may be input through the input/output interface 540. For example, the characteristic information may be changed by a user's input when the machine tool 500 or a tool or consumable related thereto is replaced, changed, or a new job is added or an existing job is removed, or may be updated by a control command, etc., based on an automatic change setting, etc. The processor 550 may identify from the characteristic information DB 534, characteristic information of a machine tool of the at least one machine tool 500, the state of which is to be determined, and may determine reference information for determining the state of the machine tool based on the identified characteristic information of the machine tool.

In the reference information DB 536 may be stored the reference information received from the server 406. In the reference information DB 536 may be stored as a database, reference information modeled differently based on the sensing information detected differently according to the type of the at least one machine tool 500, the type of tool (e.g., a flat, a ball, a drill, etc.) or consumable (e.g., cutting oil, etc.) related to the at least one machine tool 500, a processing portion, the type of a processing target (e.g., metal, etc.), or the type of a processing method (e.g., cutting, drilling, grinding, polishing, etc.). The processor 550 may periodically or aperiodically receive the reference information from the server 406, thus periodically or aperiodically updating the reference information stored in advance in the reference information DB 536.

In the determination result DB 538 may be stored the result of determining the state of the at least one machine tool 500 based on the reference information received from the server 406. In the determination result DB 538 may be stored a determination result as a database to correspond to the type of the at least one machine tool 500, the type of tool (e.g., a flat, a ball, a drill, etc.) or consumable (e.g., cutting oil, etc.) related to the at least one machine tool 500, the processing portion, the type of a processing target (e.g., metal, etc.), or the type of processing method (e.g., cutting, drilling, grinding, polishing, etc.).

The input/output interface 540 may include the entire input/output interface 150 illustrated in FIG. 1 or a part thereof. For example, a command or data input from a user or another external device may be input or output through the input/output interface 540. When the result of determining the state of the at least one machine tool 500 indicates that the state of the at least one machine tool 500 is abnormal (e.g., damage/failure or a shortage/absence of a consumable, etc.), this state may be visually or audibly notified through a specific output device (e.g., a display, a speaker, etc.).

The processor 550 may control the electronic device 501 overall. The processor 550 may information related to the state of the at least one machine tool 500 connected to the electronic device 501 (e.g., first sensing information) to the server 406 in which the information is sensed through the at least one sensor 510.

The processor 550 may receive from the server 406 through the communication circuit 520, reference information obtained based on the detected first sensing information and second sensing information related to states of the at least one external machine tools 400b-1 through 400b-m or 400c-1 through 400c-n connected to the at least one external electronic devices 401b or 401c, respectively. The reference information may include, for example, at least one of at least one reference value or a state determination condition for determining a state related to the at least one machine tool 500.

The processor 550 may determine the state related to the at least one machine tool 500 based on the received reference information. For example, the processor 550 may detect the first sensing information related to the state of the at least one machine tool 500, after receiving the reference information. The processor 550 may identify characteristic information related to the at least one machine tool 500 from the memory 530 (e.g., the characteristic information DB 534). The processor 550 may determine the state related to the at least one machine tool 500 by comparing the reference information with the detected first sensing information based on the identified characteristic information.

For example, the processor 550 may obtain reference information corresponding to the identified characteristic information from the reference information and determine whether the result of comparing the obtained reference information with the detected first sensing information satisfies a preset condition.

The processor 550 may determine the state related to the at least one machine tool 500 to be normal when the comparison result satisfies the preset condition. The processor 550 may store the determination result in the memory 530 (e.g., the determination result DB 538) when the state related to the at least one machine tool 500 is determined to be normal. The processor 550 may generate feedback information including the determination result and transmit the generated feedback information to the server 406, when the state related to the at least one machine tool 500 is determined to be normal. The processor 550 may receive reference information updated based on the feedback information from the server 406. The processor 550 may generate the feedback information in response to a feedback information request of the server 406 and receive the reference information updated based on the feedback information from the server 406. The server 406 may periodically or aperiodically transmit a feedback information request related to at least one machine tool to the electronic device 501 and/or the at least one external electronic device 401b or 401c to update the reference information by periodically or aperiodically monitoring replacement/change, a failure, etc., of the at least one machine tool 500.

The processor 550 may determine the state related to the at least one machine tool to be abnormal when the comparison result does not satisfy the preset condition. When determining the state related to the at least one machine tool to be abnormal, the processor 550 may visually and/or audibly notify the determination result to the user through the input/output interface 540 of the electronic device 501 to let the user know the determination result. For example, when determining the state related to the at least one machine tool to be abnormal, the processor 550 may output an alert message or a visual event (e.g., a color change, flickering, etc.) through a display (not shown) of the input/output interface 540 or output an alert sound or an abnormality indicating voice through a speaker (not shown) to inform the user of at least one of an abnormal state of the at least one machine tool, damage/abrasion of a tool related to the at least one machine tool, absence of a consumable related to the at least one machine tool, or a combination thereof.

The processor 550 may receive a feedback information request related to the state of the at least one machine tool among the at least one machine tools 500 from the server 406. The processor 550 may generate feedback information including the determination result related to the state of the at least one machine tool 500 in response to the feedback information request. For example, upon receiving the feedback information request, the processor 550 may obtain the determination result related to the at least one machine tool corresponding to the feedback information request in which the determination result is found from the memory 530 (e.g., the determination result DB 538). The processor 550 may generate the feedback information including the obtained determination result. The feedback information may further include at least one of characteristic information and sensing information of a machine tool, or a combination thereof. For example, when the machine tool or a tool or consumable related thereto is replaced or changed, the processor 550 may generate feedback information including characteristic information including characteristics of the machine tool or characteristics of the tool or processed product of the machine tool in which the characteristic information is found from the memory 530 (e.g., the characteristic information DB 534). When there is in the memory 530 (e.g., the sensing information DB 532) the first sensing information related to the state of the machine tool, which is detected through the at least one sensor 510 and is not transmitted to the server 406, the feedback information may be generated by including the latest first sensing information.

The processor 550 may transmit the generated feedback information to the server 406. The processor 550 may receive reference information updated based on the feedback information from the server 406.

The processor 550 may store the received updated reference information in the memory 530 (e.g., the reference information DB 536), or when there is previously stored reference information, the processor 550 may update the previously stored reference information with the received updated reference information and store the updated reference information.

According to an embodiment, the first sensing information may include, for example, an SLM. The reference information may include at least one of a maximum load variation value and a minimum load variation value among load variation values of SLMs of the at least machine tool 500, an average value of the load variation values, or a combination thereof.

According to an embodiment, the processor 550 may detect an SLM of the at least one machine tool 500 through the at least one sensor 510 to determine the state related to the at least one machine tool 500. The processor 550 may determine the state related to the at least one machine tool by comparing the load variation value of the detected SLM with the reference information. The load variation value of the detected SLM may be calculated as, for example, a difference between a maximum value and a minimum value of the detected SLM.

For example, the processor 550 may determine whether the load variation value of the detected SLM is less than the maximum load variation value when the reference information for determining the state related to the at least one machine tool 500 is set to the maximum load variation value. The processor 550 may determine that a state related to a machine tool is normal when the load variation value of the detected SLM is less than the maximum load variation value. The processor 550 may update the reference information, that is, the maximum load variation value based on the load variation value of the detected SLM when the state related to the machine tool is determined to be normal. For example, the processor 550 may calculate an average value of the load variation value of the detected SLM and the maximum load variation value and update the calculated average value as the maximum load variation value. The processor 550 may determine that a state related to a machine tool is abnormal when the load variation value of the detected SLM is greater than or equal to the maximum load variation value. When determining that the state related to the machine tool is abnormal, the processor 550 may visually and/or acoustically notify the user that the machine tool is abnormal through the input/output interface 540.

For example, the processor 550 may determine whether the load variation value of the detected SLM is less than the minimum load variation value when the reference information for determining the state related to the at least one machine tool 500 is set to the minimum load variation value. The processor 550 may determine that the state related to a machine tool is normal when the load variation value of the detected SLM is greater than or equal to the minimum load variation value. The processor 550 may update the reference information, that is, the minimum load variation value based on the load variation value of the detected SLM when the state related to the machine tool is determined to be normal. For example, the processor 550 may calculate an average value of the load variation value of the detected SLM and the minimum load variation value and update the calculated average value as the minimum load variation value. The processor 550 may determine that the state related to a machine tool is abnormal when the load variation value of the detected SLM is less than the minimum load variation value. When determining that the state related to the machine tool is abnormal, the processor 550 may visually and/or acoustically notify the user that the machine tool is abnormal through the input/output interface 540.

For example, the processor 550 may determine whether the load variation value of the detected SLM is greater than or equal to the minimum load variation value and less than the maximum load variation value when the reference information for determining the state related to the at least one machine tool 500 is set to the minimum load variation value and the maximum load variation value. The processor 550 may determine that a state related to a machine tool is normal when the load variation value of the detected SLM is greater than or equal to the minimum load variation value and less than the maximum load variation value. The processor 550 may update the reference information, that is, the minimum load variation value and the maximum load variation value based on the load variation value of the detected SLM when the state related to the machine tool is determined to be normal. For example, the processor 550 may calculate an average value of a minimum value of the detected SLM and the minimum load variation value and update the calculated average value as the minimum load variation value. The processor 550 may calculate an average value of the maximum value of the detected SLM and the maximum load variation value and update the calculated average value as the maximum load variation value. The processor 550 may determine that a state related to a machine tool is normal when the load variation value of the detected SLM is less than the minimum load variation value or greater than or equal to the maximum load variation value. When determining that the state related to the machine tool is abnormal, the processor 550 may visually and/or acoustically notify the user that the machine tool is abnormal through the input/output interface 540.

Figure 6A:
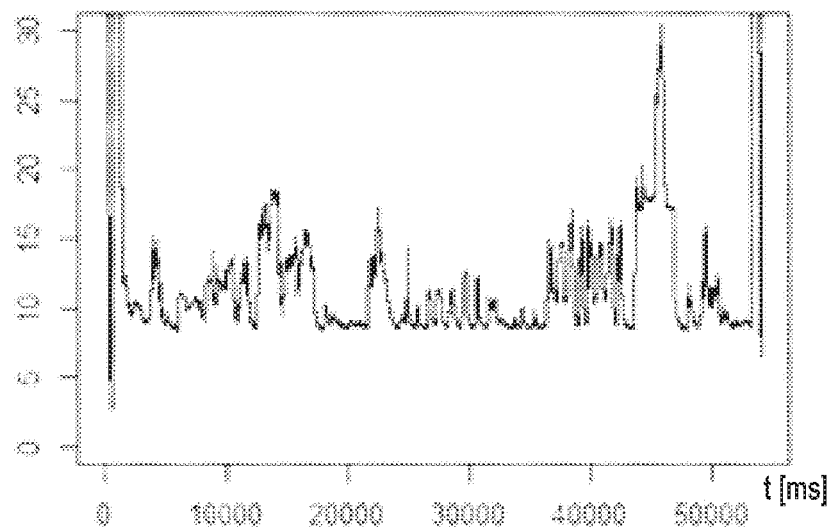
FIGS. 6A and 6B are graphs of a spindle load meter (SLM) of a machine tool connected to an electronic device according to various embodiments.
Figure 6B:
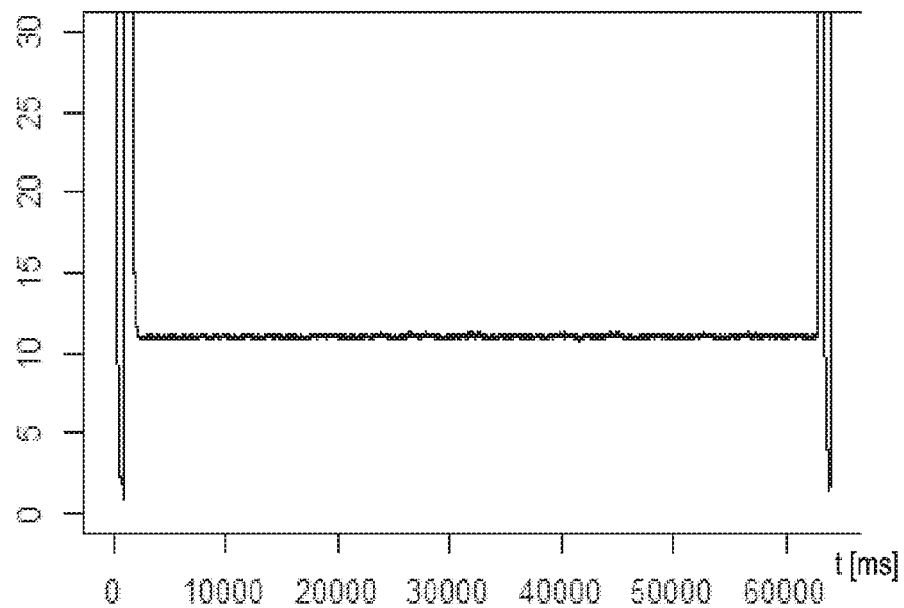

FIGS. 6A and 6B are graphs of an SLM of a machine tool connected to an electronic device according to various embodiments. FIG. 6A illustrates an example of a graph of an SLM detected by the at least one sensor 510 in a normal operation of the arbitrary machine tool 500 connected to the electronic device 501, and FIG. 6B illustrates an example of a graph of an SLM detected by the at least one sensor 510 when the machine tool 500 is damaged. In FIGS. 6A and 6B, a horizontal axis indicates a time t [ms], and a vertical axis indicates an SLM [%] numerically representing the degree (magnitude) of a spindle load.

Referring to FIG. 6A, a graph of the detected SLM shows that the SLM changes in a specific pattern in an operating period of the machine tool 500. As shown in FIG. 6A, when the machine tool 500 operates normally, the SLM may change in a specific pattern. The graph of the detected SLM may have a different value (e.g., a rate [%]) according to the of the machine tool, the type of tool (e.g., a flat, a ball, a drill, etc.) or consumable (e.g., cutting oil, etc.) related to the machine tool, the processing portion, the type of a processing target (e.g., metal, etc.), the type of processing method (e.g., cutting, drilling, grinding, polishing, etc.), or a combination thereof.

Referring to FIG. 6B, a graph of the detected SLM shows that the SLM does not change in the operating period of the machine tool 500 except for in the start and end of the operating period. As illustrated in FIG. 6B, when the machine tool 500 is abnormal due to a failure, damage, etc., the spindle load may not be caused by a processing job even when the machine tool 500 operates. In this case, the graph of the detected SLM may have an almost constant value in the operating period without a change of the SLM. Although a description has been made using the graph of the detected SLM with reference to FIG. 6B regarding a case in which the machine tool 500 is damaged, at least one of the type of a machine tool, the type of a tool or consumable related thereto, the processing portion, the type of processing target, the type of processing method, or a combination thereof may also be determined using the graph of the detected SLM.

According to various embodiments, the electronic device includes a communication circuit, at least one sensor configured to detect first sensing information related to the state of at least one machine tool connected to the electronic device, and a processor configured to transmit the detected first sensing information to a server, receive from the server, reference information obtained based on the first sensing information and second sensing information related to the state of at least one external machine tool connected to at least one external electronic device, and determine the state related to the at least one machine tool based on the received reference information.

According to various embodiments, the processor may be further configured to transmit feedback information including the result of determining the state related to the at least one machine tool to the at least one external electronic device and receive reference information updated based on the feedback information from the at least one external electronic device.

According to various embodiments, the processor may be further configured to detect the first sensing information related to the state of the at least one machine tool after receiving the reference information, identify characteristic information related to the at least one machine tool, and determine the state related to the at least one machine tool by comparing the reference information with the detected first sensing information based on the identified characteristic information.

According to various embodiments, the processor may be further configured to obtain reference information corresponding to the identified characteristic information from the reference information, determine whether the result of comparing the obtained reference information with the detected first sensing information satisfies a preset condition, determine the state related to the at least one machine tool to be normal when the result of comparison satisfies the preset condition, and determine the state related to the at least one machine tool to be abnormal when the result of comparison does not satisfy the preset condition.

According to various embodiments, the processor may be further configured to notify at least one of an abnormal state of the at least one machine tool, damage/abrasion of a tool related to the at least one machine tool, absence of a consumable related to the at least one machine tool, or a combination thereof, when determining the state related to the at least one machine tool to be abnormal.

According to various embodiments, the first sensing information related to the state of the at least one machine tool may include a spindle load meter (SLM).

According to various embodiments, the reference information may include at least one of a maximum load variation value and a minimum load variation value among load variation values of SLMs of the at least machine tool, an average value of the load variation values, or a combination thereof.

According to various embodiments, the processor may be further configured to determine whether a load variation value of the detected SLM is less than the maximum load variation value when the reference information is set to the maximum load variation value, determine a state related to a machine tool to be normal when the load variation value of the detected SLM is less than the maximum load variation value, and determine the state related to the machine tool to be abnormal when the load variation value of the detected SLM is greater than or equal to the maximum load variation value.

According to various embodiments, the processor may be further configured to determine whether a load variation value of the detected SLM is greater than or equal to the minimum load variation value when the reference information is set to the minimum load variation value, determine a state related to a machine tool to be normal when the load variation value of the detected SLM is greater than or equal to the minimum load variation value, and determine the state related to the machine tool to be abnormal when the load variation value of the detected SLM is less than the minimum load variation value.

According to various embodiments, the processor may be further configured to, when the reference information is set to the minimum load variation value and the maximum load variation value, determine whether the load variation value of the detected SLM is greater than or equal to the minimum load variation value and is less than the maximum load variation value, when the load variation value of the detected SLM is greater than or equal to the minimum load variation value and is less than the maximum load variation value, determine a state related to a machine tool to be normal, and when the load variation value of the detected SLM is less than the minimum load variation value or is greater than or equal to the maximum load variation value, determine the state related to the machine tool to be abnormal.

According to various embodiments, the processor may be configured to update the reference information based on the result of determining a state related to the at least one machine tool.

Figure 7:
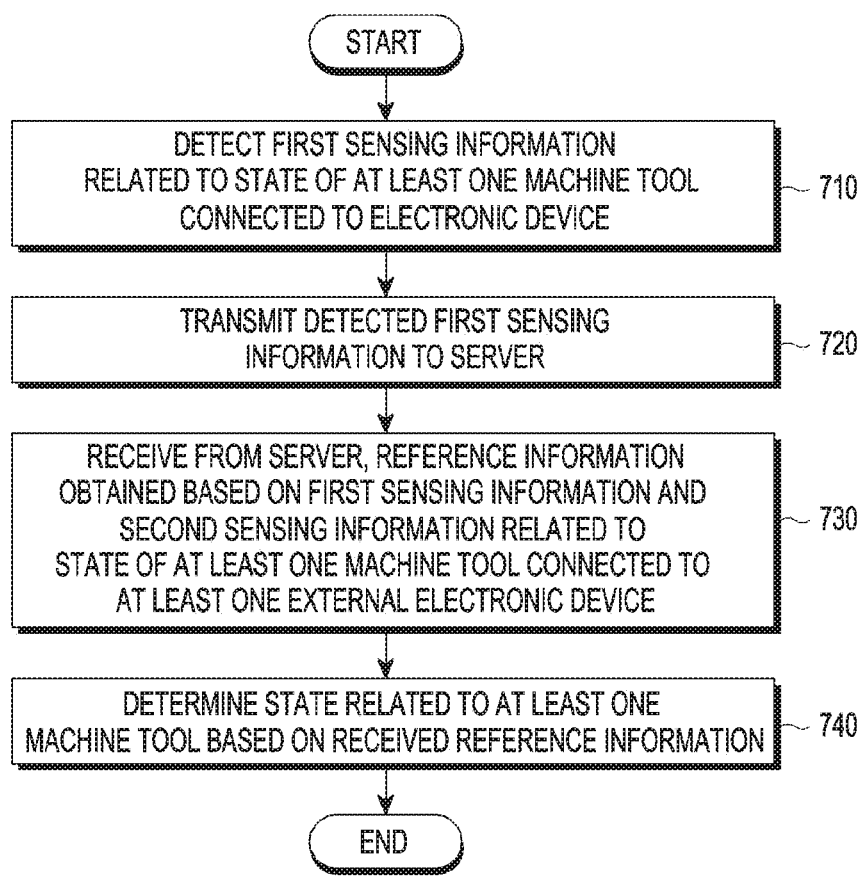
FIG. 7 is a flowchart illustrating a method for monitoring a state of a machine tool in an electronic device according to various embodiments.

FIG. 7 is a flowchart illustrating a method for monitoring the state of a machine tool in an electronic device according to various embodiments. A method for monitoring the state of a machine tool in the electronic device may include operations 710 through 740. The method for monitoring the state of the machine tool in the electronic device may be performed by an electronic device (e.g., the electronic device 501) and a processor of the electronic device (e.g., the processor 550).

In operation 710, for example, the electronic device may detect first sensing information related to the state of at least one machine tool connected to the electronic device. For example, the electronic device may detect sensing information related to the state of the at least one machine tool in a specific job using the at least one machine tool through at least one sensor included in the electronic device.

According to an embodiment, the first sensing information may include an SLM.

In operation 720, for example, the electronic device may transmit the detected first sensing information to a server (e.g., the server 406). For example, the electronic device may transmit the first sensing information detected from each of the at least one machine tool connected to the electronic device to the server.

In operation 730, for example, the electronic device may receive reference information obtained based on the first sensing information and second sensing information related to the state of at least one external machine tool connected to at least one external electronic device (e.g., the electronic device 401b or 401c) from the server.

According to an embodiment, the reference information may include at least one of at least one reference value or a state determination condition for determining the state of the at least one machine tool.

In operation 740, the electronic device may determine a state related to the at least one machine tool based on the received reference information. For example, after receiving the reference information, the electronic device may determine the state of the at least one machine tool corresponding to characteristic information of the at least one machine tool by using the first sensing information related to the state of the at least one machine tool in which the first sensing information is detected using at least one sensor of the electronic device, the characteristic information, and the received reference information.

Figure 8:
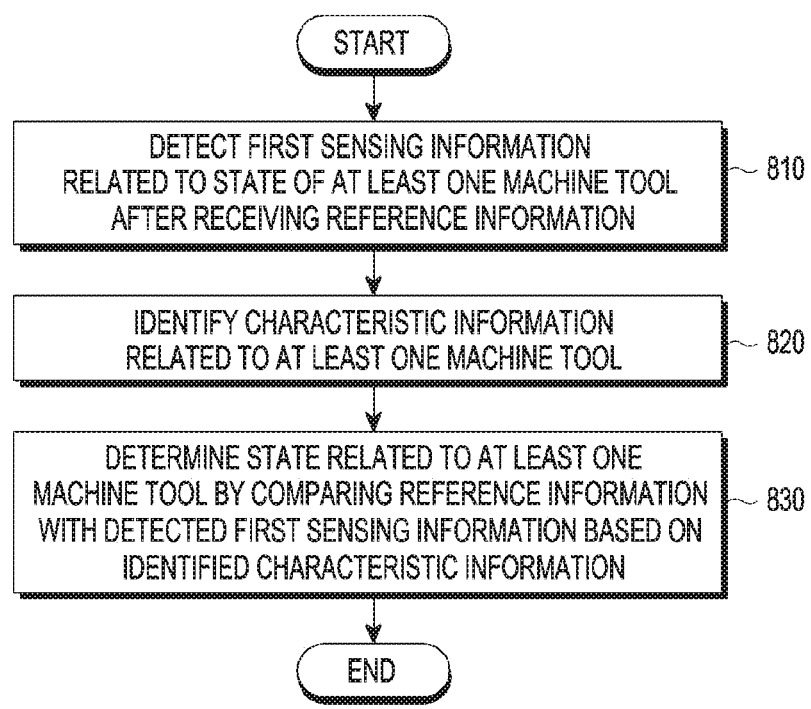
FIG. 8 is a flowchart illustrating a method for monitoring a state of a machine tool in an electronic device according to various embodiments.

FIG. 8 is a flowchart illustrating a method for monitoring the state of a machine tool in an electronic device according to various embodiments. FIG. 8 is a flowchart illustrating in detail operation 740 illustrated in FIG. 7 in which the method for monitoring the state of the machine tool in the electronic device may include operations 810 through 830. The method for monitoring the state of the machine tool in the electronic device may be performed by an electronic device (e.g., the electronic device 501) and a processor of the electronic device (e.g., the processor 550).

In operation 810, for example, the electronic device may detect the first sensing information related to the state of at least one machine tool after receiving the reference information.

In operation 820, for example, the electronic device may identify characteristic information related to the at least one machine tool. For example, the electronic device may identify the characteristic information related to the at least one machine tool from a memory (e.g., characteristic information DB) of the electronic device.

According to an embodiment, the characteristic information may include at least one of attribute information of the at least one machine tool or a tool or consumable related thereto (e.g., a number, a production line number, etc., of a machine tool/tool/consumable) or information related to a job using the at least one machine tool or a tool or consumable related thereto (e.g., a setting value corresponding to characteristics of a machine, a setting value corresponding to characteristics of a job, etc.) as a database.

In operation 830, for example, the electronic device may determine the state related to the at least one machine tool by comparing the reference information with the detected first sensing information based on the identified characteristic information. For example, the electronic device may obtain reference information corresponding to the identified characteristic information from the reference information and determine the state of the at least one machine tool to be normal or abnormal according to whether the result of comparing the obtained reference information with the detected first sensing information satisfies a preset condition.

Figure 9:
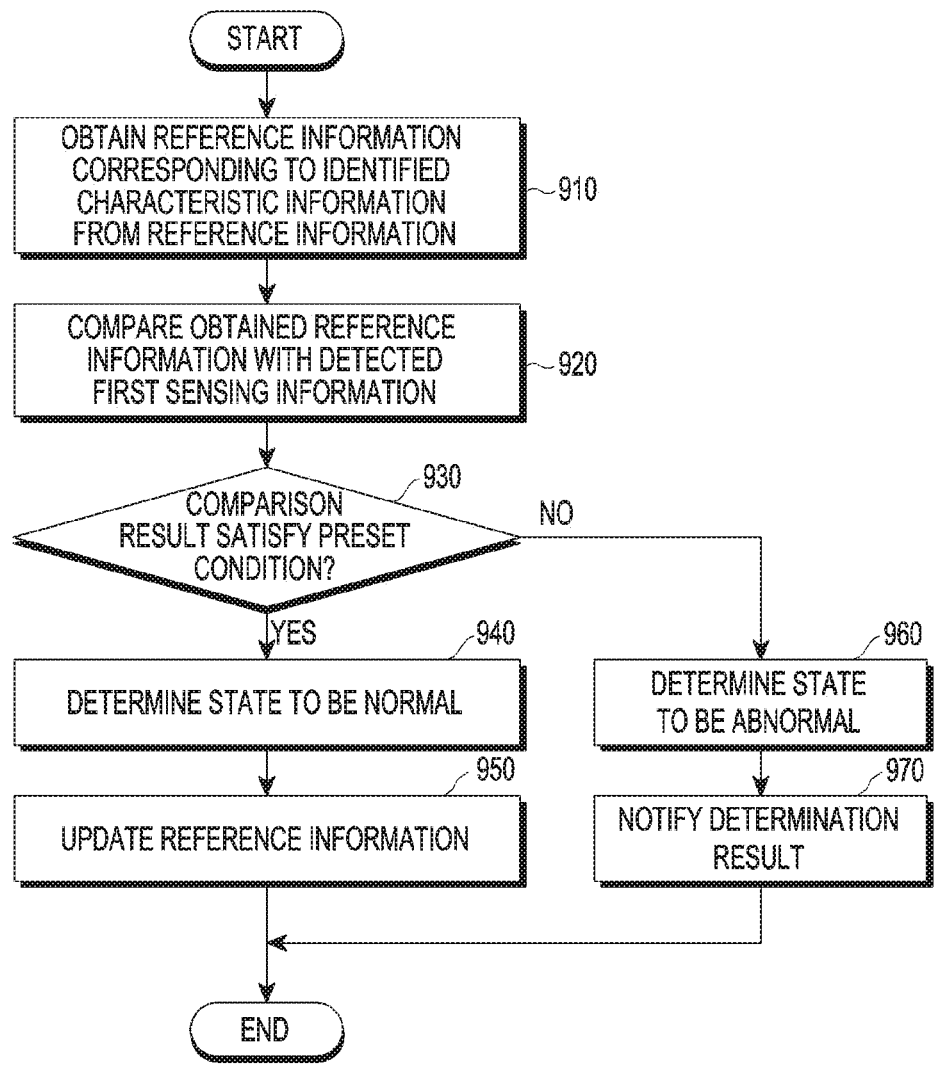
FIG. 9 is a flowchart illustrating a method for monitoring a state of a machine tool in an electronic device according to various embodiments.

FIG. 9 is a flowchart illustrating a method for monitoring the state of a machine tool in an electronic device according to various embodiments. FIG. 9 is a flowchart illustrating in detail operation 830 illustrated in FIG. 8 in which the method for monitoring the state of the machine tool in the electronic device may include operations 910 through 970. The method for monitoring the state of the machine tool in the electronic device may be performed by an electronic device (e.g., the electronic device 501) and a processor of the electronic device (e.g., the processor 550).

In operation 910, for example, the electronic device may obtain reference information corresponding to the identified characteristic information from the reference information. For example, the reference information may include at least one reference value or a state determination condition based on the characteristic information of the at least one machine tool. The electronic device may obtain reference information including at least one reference value and a state determination condition corresponding to the identified characteristic information from the reference information.

In operation 920, for example, the electronic device may compare the obtained reference information with the detected first sensing information. For example, the electronic device may compare the obtained reference information with the detected first sensing information based on the at least one reference value corresponding to the identified characteristic information and the state determination condition. For example, the electronic device may compare the at least one reference value with the detected first sensing information according to the state determination condition.

In operation 930, for example, the electronic device may determine whether the comparison result satisfies a preset condition. For example, the electronic device may determine whether the result of comparing the at least one reference value with the detected first sensing information satisfies the state determination condition. In operation 930, when determining that the comparison result satisfies the preset condition, the electronic device may go to operation 940; when determining that the comparison result does not meet the preset condition, the electronic device may go to operation 960.

In operation 940, for example, the electronic device may determine a state related to the at least one machine tool to be normal when determining that the comparison result satisfies the preset condition.

In operation 950, for example, the electronic device may update the reference information based on the detected first sensing information when determining that the state related to the at least one machine tool to be normal. For example, the electronic device may calculate an average value of the first sensing information and the reference value and update the reference information by setting the calculated average value as the reference value.

In operation 960, for example, the electronic device may determine a state related to the at least one machine tool to be abnormal when determining that the comparison result does not satisfy the preset condition.

According to an embodiment, the abnormal state may include at least one of an abnormal state of the at least one machine tool, damage/abrasion of a tool related to the at least one machine tool, the absence of a consumable related to the at least one machine tool, or a combination thereof.

In operation 970, when determining that the state related to the at least one machine tool to be abnormal, the electronic device may notify the determination result through an input/output interface thereof. For example, when determining the state related to the at least one machine tool to be abnormal, the electronic device may output an alert message or a visual event (e.g., a color change, flickering, etc.) through an input/output interface (e.g., a display) of the electronic device or output an alert sound or an abnormality indicating voice through an input/output interface (e.g., a speaker) of the electronic device to inform the user of at least one of an abnormal state of the at least one machine tool, damage/abrasion of a tool related to the at least one machine tool, absence of a consumable related to the at least one machine tool, or a combination thereof.

Figure 10:
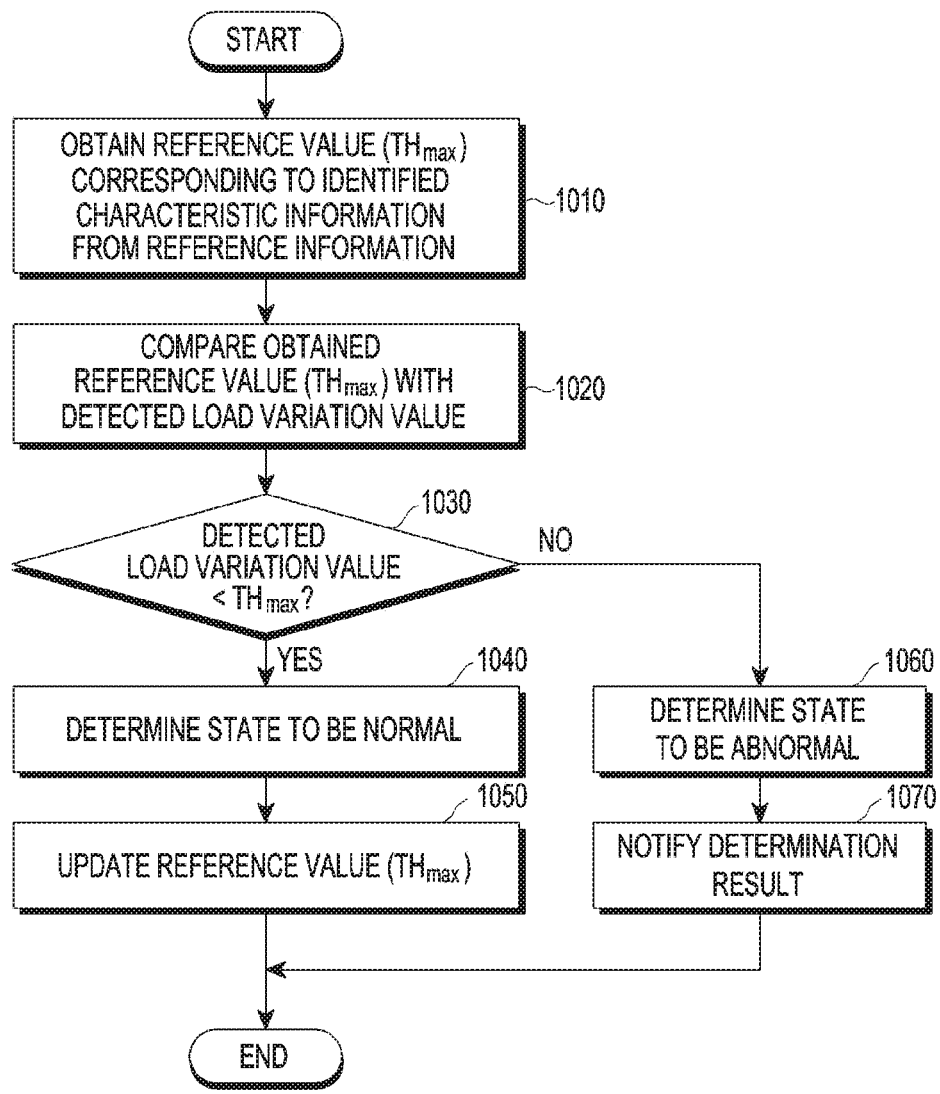
FIG. 10 is a flowchart illustrating a method for monitoring a state of a machine tool in an electronic device according to various embodiments.

FIG. 10 is a flowchart illustrating a method for monitoring the state of a machine tool in an electronic device according to various embodiments. A method for monitoring the state of a machine tool in the electronic device may include operations 1010 through 1070. The method for monitoring the state of the machine tool in the electronic device may be performed by an electronic device (e.g., the electronic device 501) and a processor of the electronic device (e.g., the processor 550).

In operation 1010, for example, the electronic device may obtain reference information corresponding to the identified characteristic information from the reference information. For example, the reference information may include at least one reference value or a state determination condition based on the characteristic information of the at least one machine tool. The electronic device may obtain reference information including at least one reference value and a state determination condition corresponding to the identified characteristic information from the reference information.

In the current embodiment, the first sensing information is assumed to be a load variation value of the detected SLM for the at least one machine tool, and a reference value as the reference information is assumed to be a maximum load variation value $TH_{max}$. The load variation value of the detected SLM may be calculated as, for example, a difference between a maximum value and a minimum value of the detected SLM.

In operation 1020, for example, the electronic device may compare the load variation value of the detected SLM with the maximum load variation value $TH_{max}$.

In operation 1030, for example, the electronic device may determine whether the load variation value of the detected SLM is less than the maximum load variation value $TH_{max}$. In operation 1030, when determining that the load variation value of the detected SLM is less than the maximum load variation value $TH_{max}$, the electronic device may perform operation 1040; when determining that the load variation value of the detected SLM is greater than or equal to the maximum load variation value $TH_{max}$, the electronic device may perform operation 1060.

In operation 1040, for example, the electronic device may determine a state related to the at least one machine tool to be normal when determining that the load variation value of the detected SLM is less than the maximum load variation value $TH_{max}$.

In operation 1050, for example, the electronic device may update the maximum load variation value $TH_{max}$, which is the reference value, based on the load variation value of the detected SLM when determining that the state related to the at least one machine tool to be normal. For example, the electronic device may calculate an average value of the load variation value of the detected SLM and the maximum load variation value and update the maximum load variation value by setting the calculated average value as the reference value.

In operation 1060, for example, the electronic device may determine the state related to the at least one machine tool to be abnormal when determining that the load variation value of the detected SLM is greater than or equal to the maximum load variation value $TH_{max}$.

In operation 1070, when determining that the state related to the at least one machine tool to be normal, the electronic device may visually and/or acoustically notify the user that the machine tool is abnormal through the input/output interface of the electronic device. Operation 1070 is the same as operation 970 of FIG. 9, and thus a description thereof will be replaced with the foregoing description of operation 970.

Figure 11:
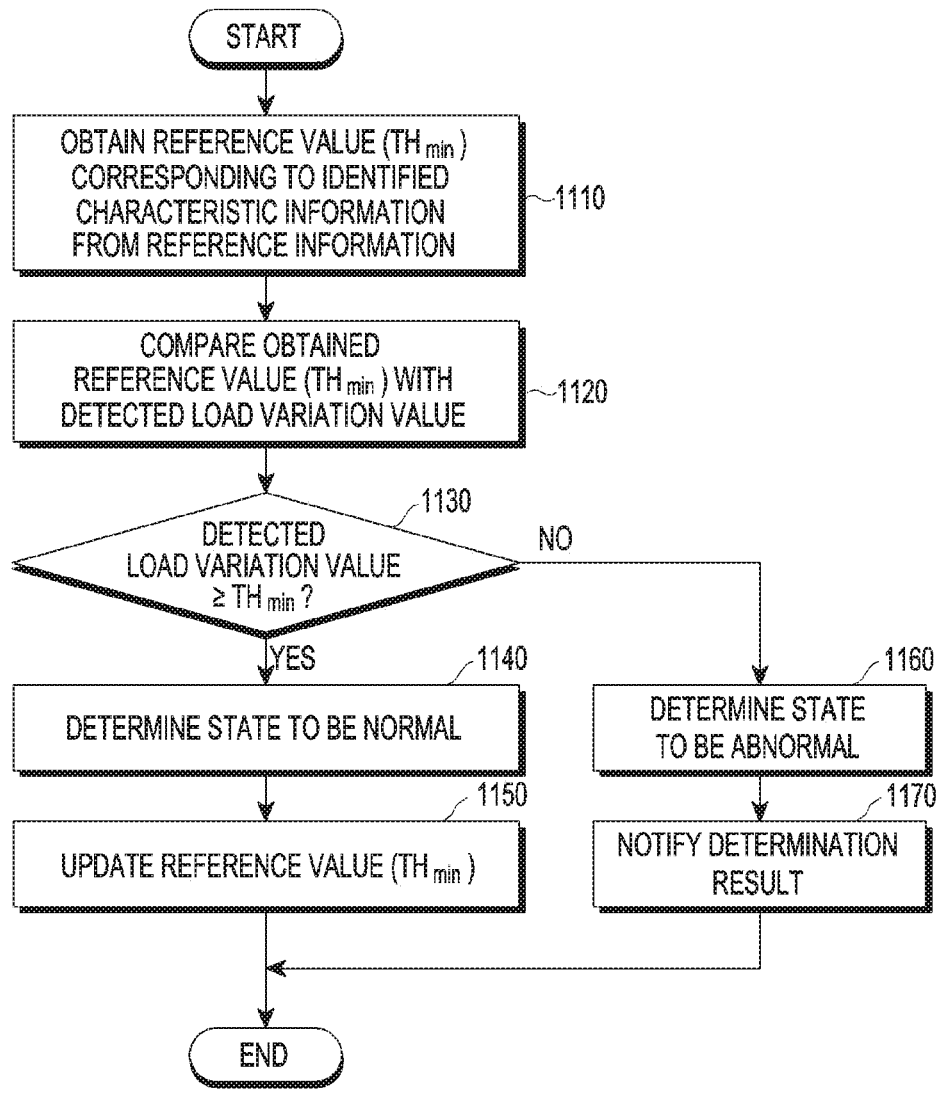
FIG. 11 is a flowchart illustrating a method for monitoring a state of a machine tool in an electronic device according to various embodiments.

FIG. 11 is a flowchart illustrating a method for monitoring the state of a machine tool in an electronic device according to various embodiments. A method for monitoring the state of a machine tool in the electronic device may include operations 1110 through 1170. The method for monitoring the state of the machine tool in the electronic device may be performed by an electronic device (e.g., the electronic device 501) and a processor of the electronic device (e.g., the processor 550).

In operation 1110, for example, the electronic device may obtain reference information corresponding to the identified characteristic information from the reference information. For example, the reference information may include at least one reference value or a state determination condition based on the characteristic information of the at least one machine tool. The electronic device may obtain reference information including at least one reference value and a state determination condition corresponding to the identified characteristic information from the reference information.

In the current embodiment, the first sensing information is assumed to be a load variation value of the detected SLM for the at least one machine tool, and a reference value as the reference information is assumed to be a minimum load variation value $TH_{min}$. The load variation value of the detected SLM may be calculated as, for example, a difference between a maximum value and a minimum value of the detected SLM.

In operation 1120, for example, the electronic device may compare the load variation value of the detected SLM with the minimum load variation value $TH_{min}$.

In operation 1130, for example, the electronic device may determine whether the load variation value of the detected SLM is greater than or equal to the minimum load variation value $TH_{min}$.

In operation 1130, when determining that the load variation value of the detected SLM is greater than or equal to the minimum load variation value $TH_{min}$, the electronic device may perform operation 1140; when determining that the load variation value of the detected SLM is less than the minimum load variation value $TH_{min}$, the electronic device may perform operation 1160.

In operation 1140, for example, the electronic device may determine a state related to the at least one machine tool to be normal when determining that the load variation value of the detected SLM is greater than or equal to the minimum load variation value $TH_{min}$.

In operation 1150, for example, the electronic device may update the minimum load variation value $TH_{min}$, which is the reference value, based on the load variation value of the detected SLM when determining that the state related to the at least one machine tool to be normal. For example, the electronic device may calculate an average value of the load variation value of the detected SLM and the minimum load variation value $TH_{min}$ and update the minimum load variation value $TH_{min}$ by setting the calculated average value as the reference value.

In operation 1160, for example, the electronic device may determine the state related to the at least one machine tool to be abnormal when determining that the load variation value of the detected SLM is less than the minimum load variation value $TH_{min}$.

In operation 1170, when determining that the state related to the at least one machine tool to be normal, the electronic device may visually and/or acoustically notify the user that the machine tool is abnormal through the input/output interface of the electronic device. Operation 1170 is the same as operation 970 of FIG. 9, and thus a description thereof will be replaced with the foregoing description of operation 970.

Figure 12:
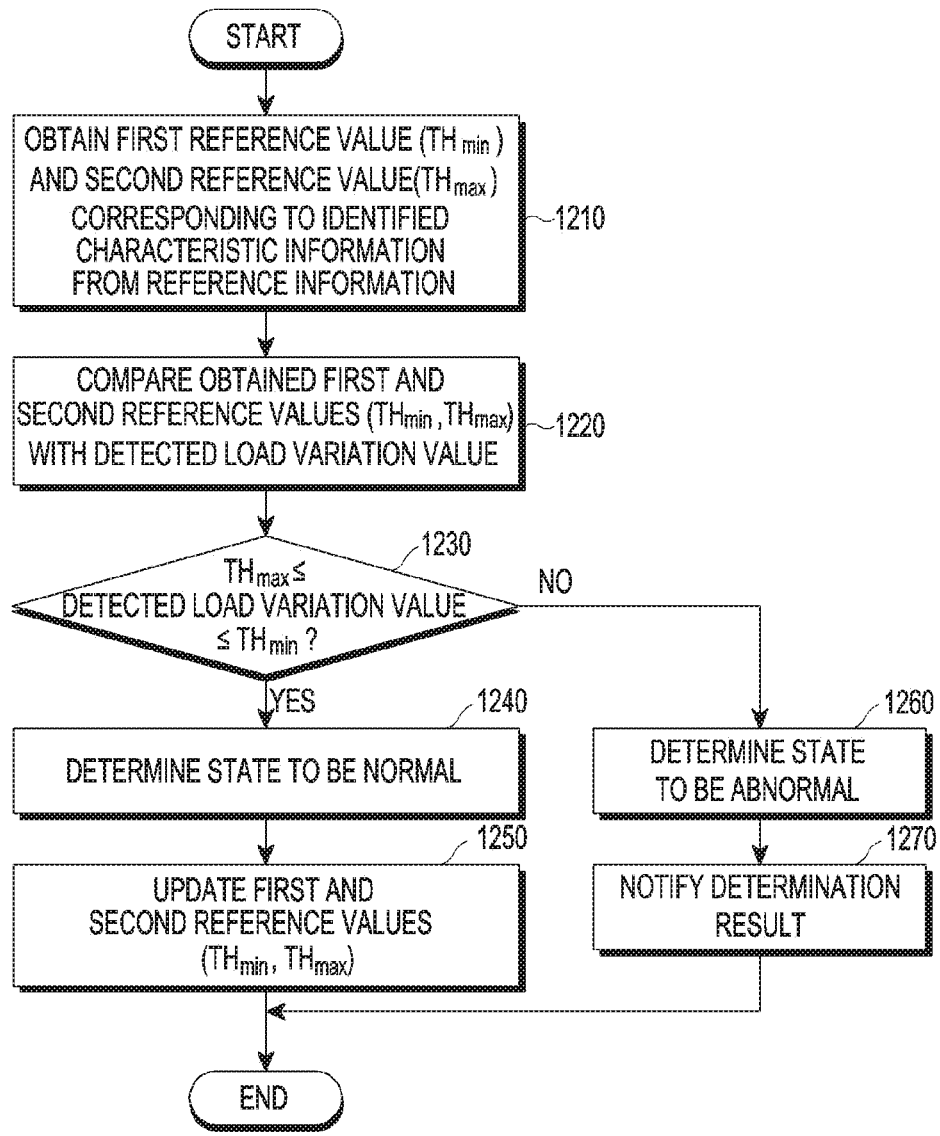
FIG. 12 is a flowchart illustrating a method for monitoring a state of a machine tool in an electronic device according to various embodiments.

FIG. 12 is a flowchart illustrating a method for monitoring the state of a machine tool in an electronic device according to various embodiments. A method for monitoring the state of a machine tool in the electronic device may include operations 1210 through 1270. The method for monitoring the state of the machine tool in the electronic device may be performed by an electronic device (e.g., the electronic device 501) and a processor of the electronic device (e.g., the processor 550).

In operation 1210, for example, the electronic device may obtain reference information corresponding to the identified characteristic information from the reference information. For example, the reference information may include at least one reference value or a state determination condition based on the characteristic information of the at least one machine tool. The electronic device may obtain reference information including at least one reference value and a state determination condition corresponding to the identified characteristic information from the reference information.

In the current embodiment, the first sensing information is assumed to be the load variation value of the detected SLM for the at least one machine tool, and the reference value as the reference information is assumed to be the minimum load variation value $TH_{min}$ and the maximum load variation value $TH_{max}$. The load variation value of the detected SLM may be calculated as, for example, a difference between a maximum value and a minimum value of the detected SLM.

In operation 1220, for example, the electronic device may compare the load variation value of the detected SLM with the minimum load variation value $TH_{min}$.

In operation 1230, for example, the electronic device may determine whether the load variation value of the detected SLM is greater than or equal to the minimum load variation value $TH_{min}$ and is less than the maximum load variation value $TH_{max}$.

In operation 1230, when determining that the load variation value of the detected SLM is greater than or equal to the minimum load variation value $TH_{min}$ and is less than the maximum load variation value $TH_{max}$, the electronic device may perform operation 1240; when determining that the load variation value of the detected SLM is less than the minimum load variation value $TH_{min}$ or is greater than or equal to the maximum load variation value $TH_{max}$, the electronic device may perform operation 1260.

In operation 1240, for example, the electronic device may determine a state related to the at least one machine tool to be normal when determining that the load variation value of the detected SLM is greater than or equal to the minimum load variation value $TH_{min}$ and is less than the maximum load variation value $TH_{max}$.

In operation 1250, for example, the electronic device may update the minimum load variation value $TH_{min}$ and the maximum load variation value $TH_{max}$, which are the reference values, based on the load variation value of the detected SLM when determining that the state related to the at least one machine tool to be normal. For example, the electronic device may calculate an average value of a minimum value of the detected SLM and the minimum load variation value $TH_{min}$ and update the minimum load variation value $TH_{min}$ by setting the calculated average value as a first reference value. For example, the electronic device may calculate an average value of a maximum value of the detected SLM and the maximum load variation value $TH_{max}$ and update the maximum load variation value $TH_{max}$ by setting the calculated average value as a second reference value.

In operation 1260, for example, the electronic device may determine a state related to the at least one machine tool to be abnormal when determining that the load variation value of the detected SLM is less than the minimum load variation value $TH_{min}$ or is greater than or equal to the maximum load variation value $TH_{max}$.

In operation 1270, when determining that the state related to the at least one machine tool to be normal, the electronic device may visually and/or acoustically notify the user that the machine tool is abnormal through the input/output interface of the electronic device. Operation 1270 is the same as operation 970 of FIG. 9, and thus a description thereof will be replaced with the foregoing description of operation 970.

Figure 13:
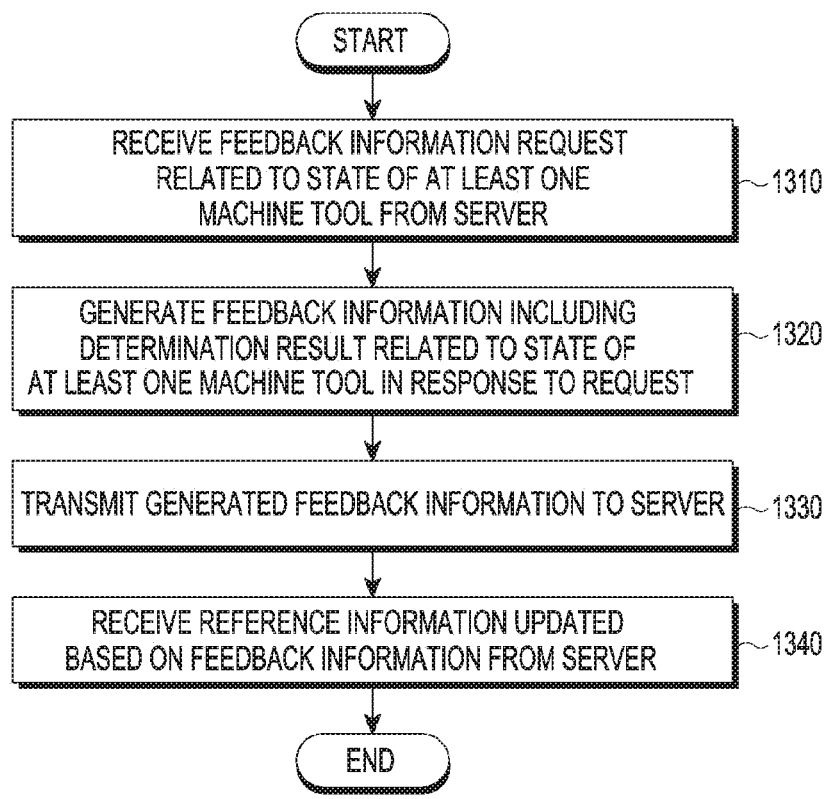
FIG. 13 is a flowchart illustrating a method for monitoring a state of a machine tool in an electronic device according to various embodiments.

FIG. 13 is a flowchart illustrating a method for monitoring the state of a machine tool in an electronic device according to various embodiments. A method for monitoring the state of a machine tool in the electronic device may include operations 1310 through 1340. The method for monitoring the state of the machine tool in the electronic device may be performed by an electronic device (e.g., the electronic device 501) and a processor of the electronic device (e.g., the processor 550).

In operation 1310, for example, the electronic device may receive a feedback information request related to the state of the at least one machine tool from the server (e.g., the server 406).

In operation 1320, for example, the electronic device may generate feedback information including the determination result related to the state of the at least one machine tool in response to the feedback information request. For example, upon receiving the feedback information request from the server, the electronic device may obtain the determination result related to the at least one machine tool corresponding to the feedback information request in which the determination result is found from the memory (e.g., the determination result DB) of the electronic device. The electronic device may generate the feedback information including the obtained determination result.

According to an embodiment, the feedback information may further include at least one of characteristic information and sensing information of a machine tool, or a combination thereof. For example, when the machine tool or a tool or consumable related thereto is replaced or changed, the electronic device may generate feedback information including characteristic information including characteristics of the machine tool or characteristics of the tool or processed product of the machine tool in which the characteristic information is found from the memory (e.g., the characteristic information DB). When there is in the memory (e.g., the sensing information DB) the first sensing information related to the state of the machine tool, which is detected through the at least one sensor and is not transmitted to the server, the feedback information may be generated by including the latest first sensing information.

In operation 1330, for example, the electronic device may transmit the generated feedback information to the server.

In operation 1340, for example, the electronic device may receive reference information updated based on the feedback information from the server. The electronic device may store the received updated reference information in the memory (e.g., the reference information DB), or when there is previously stored reference information, the processor 550 may update the previously stored reference information with the received updated reference information and store the updated reference information. The electronic device may periodically or aperiodically determine the state related to the at least one machine tool based on the updated reference information.

According to various embodiments, a method for monitoring the state of a machine tool in an electronic device includes detecting first sensing information related to the state of at least one machine tool connected to the electronic device, transmitting the detected first sensing information to a server, receiving from the server, reference information obtained based on the detected first sensing information and second sensing information related to the state of at least one external machine tool connected to at least one external electronic device, and determining the state related to the at least one machine tool based on the received reference information.

According to various embodiments, the method may further include receiving a request for feedback information related to the state of the at least one machine tool from the server, generating the feedback information including the result of the determination related to the state of the at least one machine tool in response to the request, transmitting the generated feedback information to the server, and receiving reference information updated based on the feedback information from the server.

According to various embodiments, the determining of the state related to the at least one machine tool may include detecting the first sensing information related to the state of the at least one machine tool after receiving the reference information, identifying characteristic information related to the at least one machine tool, and determining the state related to the at least one machine tool by comparing the reference information with the detected first sensing information based on the identified characteristic information.

According to various embodiments, the determining of the state related to the at least one machine tool may include obtaining reference information corresponding to the identified characteristic information from the reference information, determining whether the result of comparing the obtained reference information with the detected first sensing information satisfies a preset condition, and determining the state related to the at least one machine tool to be normal when the result of comparison satisfies the preset condition and determining the state related to the at least one machine tool to be abnormal when the result of comparison does not satisfy the preset condition.

Figure 14:
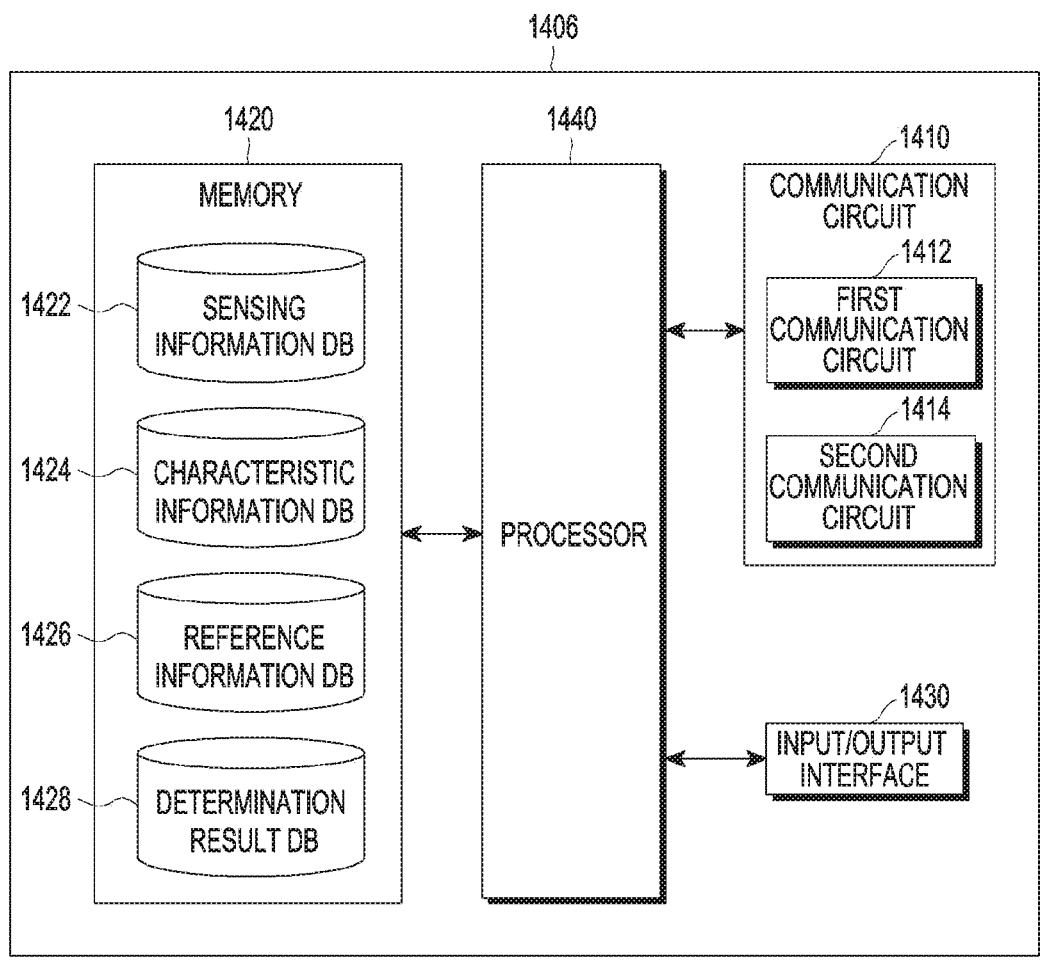
FIG. 14 is a block diagram of a server according to various embodiments.

FIG. 14 is a block diagram of a server according to various embodiments. FIG. 14 illustrates only components related to various embodiments of the present disclosure, and may also include components other than the foregoing or illustrated components. For example, the server 1406 may include the server 406 illustrated in FIG. 4 or a part thereof. Referring to FIG. 14, the server 1406 may include at least one of a communication circuit 1410, a memory 1420, an input/output interface 1430, or a processor 1440.

Based on sensing information related to the state of at least one machine tool (e.g., the machine tools 400-1 through 400-n, 400a-1 through 400a-1, 400b-1 through 400b-m, or 400c-1 through 400c-n illustrated in FIG. 4 or the machine tool 500 illustrated in FIG. 5) respectively connected to a plurality of external electronic devices (e.g., the electronic devices 401-1 through 401-n, 401a, 401b, 401c illustrated in FIG. 4 or the electronic device 501 illustrated in FIG. 5, the server 1406 may generate reference information for determining a state related to the at least one machine tool and provide the generated reference information to each of the plurality of external electronic devices. To facilitate a description, in the current embodiment, reference numerals of the plurality of electronic devices and the at least one machine tool will be omitted unless they are necessary.

The communication circuit 1410 may perform communication with each of the plurality of external electronic devices, and may include, for example, at least one of a first communication circuit 1412 or a second communication circuit 1414. The communication circuit 1410 may include the entire communication interface 170 illustrated in FIG. 1 or a part thereof or the communication module 220 illustrated in FIG. 2 or a part thereof. The communication circuit 1410 may be referred to as a communication unit or a communication module, may include the communication unit or the communication module as a part thereof, or may constitute the communication unit or the communication module.

According to an embodiment, the first communication circuit 1415 may provide data based on short-range communication. For example, the communication circuit 1410 may communicate with at least one of the plurality of external electronic devices connected to a first network through the first communication circuit 1412. For example, the first communication circuit 1412 may include at least one of WiFi, BT, NFC, ZigBee, Z-Wave, a GNSS, etc.

According to an embodiment, the second communication circuit 1414 may provide a service based on packet data (or an Internet protocol (IP)). For example, the communication circuit 1410 may communicate with at least one of the plurality of external electronic devices connected to a second network through the second communication circuit 1414. The second communication circuit 1414 may include at least one of a computer network (e.g., a LAN or WAN), Internet, or a telephone network.

The communication circuit 1410 may perform communication connection with at least one of a plurality of external electronic devices through at least one of the first communication circuit 1412 or the second communication circuit 1414, and may transmit/receive information to/from the at least one external electronic device. For example, the information may include at least some of sensing information related to the state of the at least one machine tool connected to each of the plurality of external electronic devices, reference information for determining the state of the at least one machine tool, or feedback information for updating the reference information.

The memory 1420 may store instructions or data related to at least one other element of the server 1406. The electronic device 1420 may include the memory 130 illustrated in FIG. 1 or a part thereof. The memory 1420 may include at least one of a sensing information database (DB) 1422 in which is stored the sensing information related to the state of the at least one machine tool, respectively detected through at least one sensor (e.g., the sensor 510 illustrated in FIG. 5) included in each of the plurality of electronic devices, a characteristic information DB 1424 in which are stored characteristics related to the at least one machine tool, a reference information DB 1426 in which is stored the reference information for determining the state of the at least one machine tool, or a determination result DB 1428 in which is stored the result of determining a state related to the at least one machine tool.

In the sensing information DB 1422 may be stored the sensing information related to the state of the at least one machine tool in which the sensing information is periodically or aperiodically received respectively from the plurality of external electronic devices, under control of the processor 1440. In the sensing information DB 1422, the sensing information periodically or aperiodically received respectively from the plurality of external electronic devices may be stored in such a way to be accumulated or updated. In the sensing information DB 1422 may be stored for each of the plurality of external electronic devices, sensing information as a database to correspond to the type of the at least one machine tool, the type of a tool (e.g., a flat, a ball, a drill, etc.) or consumable (e.g., cutting oil, etc.) related to the at least machine tool 500, a processing portion, the type of processing target (e.g., metal, etc.), or the type of processing method (e.g., cutting, drilling, grinding, polishing, etc.).

In the characteristic information DB 1424 may be stored for each of the plurality of external electronic devices, at least one of attribute information of the at least one machine tool or a tool or consumable related thereto (e.g., a product name (or an equipment name), a product number, a production line number, etc., of a machine tool/tool/consumable) or information related to a job using the at least one machine tool or a tool or consumable related thereto (e.g., a setting value corresponding to characteristics of a machine, a setting value corresponding to characteristics of a job, etc.) as a database. The characteristic information may be stored in advance in the characteristic information DB 1424 or may be respectively received from the plurality of external electronic devices. For example, if the characteristic information is changed by a user's input when each of the plurality of electronic devices replaces or changes the machine tool or a tool or consumable related thereto, adds a new job, or removes an existing job, or when the characteristic information is updated by a control command, etc., based on an automatic change setting, etc., then the server 1406 may receive the changed characteristic information from the corresponding external electronic device. The server 1406 may periodically or aperiodically receive the characteristic information from the plurality of external electronic devices in response to a request of the server 1406.

The processor 1440 may identify from the characteristic information DB 1424, characteristic information of a machine tool for which reference information for determining the state of the at least one machine tool is to be generated, and may set at least one of a reference value or a state determination condition when generating reference information for determining the state of the machine tool based on the identified characteristic information of the machine tool.

In the reference information DB 1426 may be stored reference information generated based on the sensing information related to the state of the at least one machine tool respectively received from the plurality of external electronic devices. In the reference information DB 1426 may be stored for each of the plurality of external electronic devices as a database, reference information modeled differently based on the sensing information detected differently according to the type of the at least one machine tool, the type of tool (e.g., a flat, a ball, a drill, etc.) or consumable (e.g., cutting oil, etc.) related to the machine tool, a processing portion, the type of processing target (e.g., metal, etc.), or the type of processing method (e.g., cutting, drilling, grinding, polishing, etc.). The server 1406 may periodically or aperiodically receive, respectively, sensing information related to the state of the at least one machine tool from each of the plurality of external electronic devices and periodically or aperiodically update reference information stored previously in the reference information DB 538 based on the respectively received sensing information, under control of the processor 1440.

In the determination result DB 1428 may be stored for each of the plurality of external electronic devices, the result of determining the state of the at least one machine tool obtained from feedback information including the result of determining the state of the at least one machine tool respectively received from the plurality of external electronic devices. In the determination result DB 1428 may be stored for each of the plurality of external electronic devices, a determination result as a database to correspond to the type of the at least one machine tool 500, the type of tool (e.g., a flat, a ball, a drill, etc.) or consumable (e.g., cutting oil, etc.) related to the machine tool, a processing portion, the type of processing target (e.g., metal, etc.), or the type of processing method (e.g., cutting, drilling, grinding, polishing, etc.).

The input/output interface 1430 may include the entire input/output interface 150 illustrated in FIG. 1 or a part thereof. For example, a command or data input from a user or another external device may be input or output through the input/output interface 1430.

The processor 1440 may control the server 1406 overall. The processor 1440 may respectively receive the sensing information related to the state of the at least one machine tool connected to each of the plurality of external electronic devices from the plurality of external electronic devices through the communication circuit 1410. For example, the plurality of external electronic devices may detect the sensing information related to the state of the at least one machine tool connected to each of the plurality of external electronic devices through at least one sensor included in each of the plurality of external electronic devices and may respectively transmit the detected sensing information to the server. In this way, the server may respectively receive the detected sensing information from the plurality of external electronic devices.

The processor 1440 may generate reference information for determining the state related to the at least one machine tool connected to each of the plurality of external electronic devices based on the respectively received sensing information. The respectively received sensing information may further include, for example, characteristic information of the at least one machine tool. The sensing information may have a different value according to characteristics of the at least one machine tool. For example, the sensing information may have a different value according to the type of the at least one machine tool, the type of tool (e.g., a flat, a ball, a drill, etc.) or consumable (e.g., cutting oil, etc.) related to the machine tool, a processing portion, the type of processing target (e.g., metal, etc.), or the type of processing method (e.g., cutting, drilling, grinding, polishing, etc.). The respectively received sensing information may further include sensing information corresponding to the characteristic information of the at least one machine tool.

According to an embodiment, the processor 1440 may classify the respectively received sensing information for each of the plurality of external electronic devices based on the characteristic information of the at least one machine tool, and may respectively generate reference information based on the sensing information for the classified characteristic information. The characteristic information of the at least one machine tool may include, for example, at least one of the type of the at least one machine tool, the type of tool or consumable related to the at least one machine tool, a processing portion, the type of processing target, the type of processing method, or a combination thereof.

According to an embodiment, the respectively received sensing information may include an SLM of the at least one machine tool.

The processor 1440 may respectively transmit the reference information generated for each of the plurality of external electronic devices to the plurality of external electronic devices through the communication circuit 1410. Generation of the reference information will be described in more detail with reference to FIG. 15.

Figure 15:
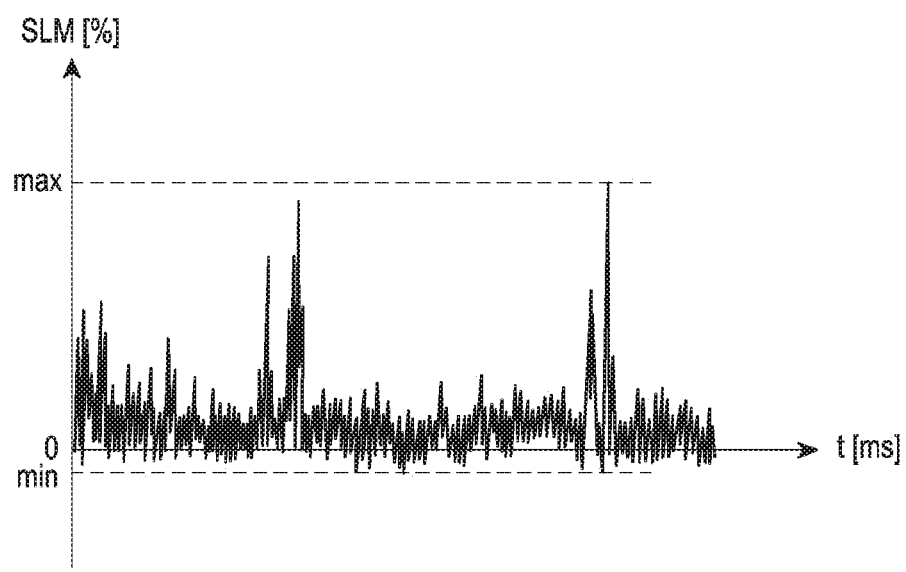
FIG. 15 illustrates an example of a method for generating reference information for determining a state of a machine tool in a server according to various embodiments.

FIG. 15 illustrates an example of a method for generating reference information for determining the state of a machine tool in a server according to various embodiments.

Referring to FIG. 15, a spindle load graph of a machine tool is illustrated. A horizontal axis indicates a time t [ms], and a vertical axis indicates an SLM [%] numerically representing the degree (magnitude) of a spindle load.

The processor 1440 may receive an SLM having a spindle load variation pattern during an operating period of a machine tool such as the spindle load graph illustrated in FIG. 15, as sensing information respectively received from the plurality of electronic devices.

The processor 1440 may generate reference information including at least one reference value for determining a state related to the machine tool based on the SLM.

For example, the processor 1440 may calculate a load variation value that is a difference between a maximum value max and a minimum value min of the SLM. In this way, the processor 1440 may respectively calculate SLM load variation values for the at least one machine tool based on the respectively received sensing information. The processor 1440 may calculate an average value of the respectively calculated load variation values and set the calculated average value as a reference value for determining the state related to the at least one machine tool. The processor 1440 may set a state determination condition for determining the state related to the at least one machine tool by using the average value set as the reference value based on characteristic information of the machine tool. The processor 1440 may generate the reference information including the set reference value and the state determination condition.

According to an embodiment, the processor 1440 may set at least one of a maximum load variation value or a minimum load variation value among the respectively calculated load variation values as the reference value for determining the state related to the at least one machine tool. The processor 1440 may set a state determination condition for determining the state related to the at least one machine tool by using at least one of the maximum load variation value or the minimum load variation value that is set as the reference value based on characteristic information of the machine tool. The processor 1440 may generate the reference information including the set reference value and the set state determination condition.

According to various embodiments, an electronic device includes a communication circuit configured to communicate with a plurality of external electronic devices and a processor configured to respectively receive from the plurality of external electronic devices, sensing information related to the state of at least one machine tool respectively connected to the plurality of external electronic devices, generate reference information for determining a state related to the at least one machine tool respectively connected to the plurality of external electronic devices based on the respectively received sensing information, and respectively transmit the generated reference information to the plurality of external electronic devices.

According to various embodiments, the processor may be further configured to periodically send a request for feedback information related to the state of the at least one machine tool to at least one external electronic device among the plurality of external electronic devices after transmitting the generated reference information, receive feedback information related to the state of the at least one machine tool from the at least one external electronic device, update reference information related to the at least one machine tool in the reference information based on the received feedback information, and transmit the updated reference information to the at least one external electronic device.

According to various embodiments, the sensing information related to the state of the at least one machine tool respectively received from the plurality of external electronic devices may include a spindle load meter (SLM).

According to various embodiments, the processor may be further configured to respectively calculate a load variation value that is a difference between a maximum value max and a minimum value min of the SLM, calculate an average value of the respectively calculated load variation values, and set the calculated average value as the reference value.

According to various embodiments, the processor may be further configured to respectively calculate a load variation value that is a difference between a maximum value max and a minimum value min of the SLM, select at least one of a maximum load variation value or a minimum load variation value among the respectively calculated load variation values, and set the selected average value as the reference value.

Figure 16:
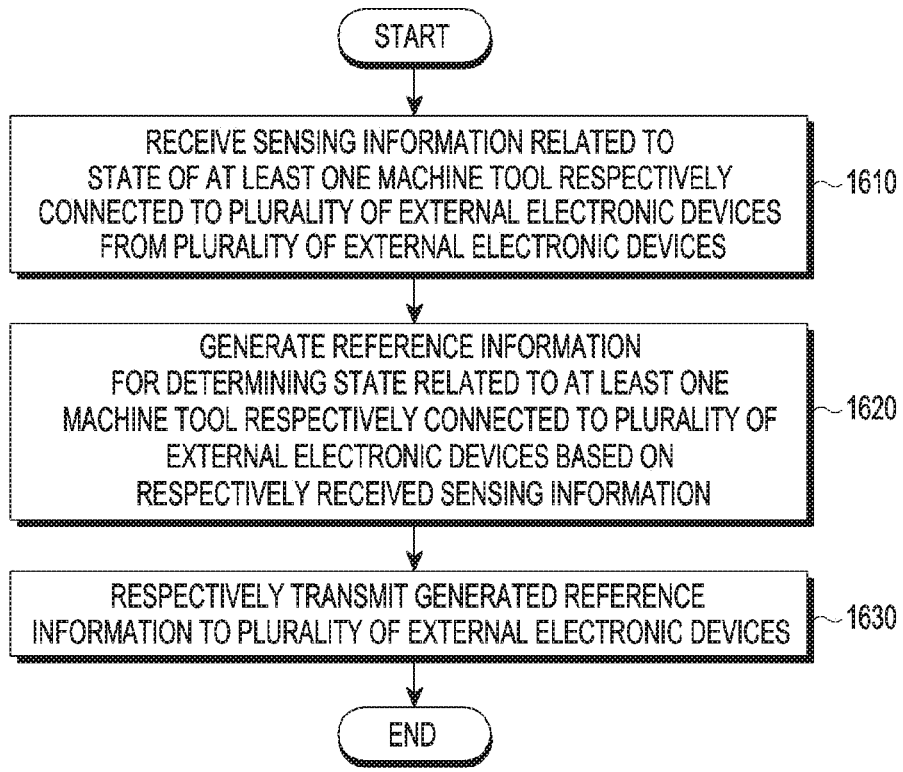
FIG. 16 is a flowchart illustrating a method for monitoring a state of a machine tool in a server according to various embodiments.

FIG. 16 is a flowchart illustrating a method for monitoring the state of a machine tool in a server according to various embodiments. A method for monitoring the state of a machine tool in the server may include operations 1610 through 1630. The method for monitoring the state of the machine tool in the server may be performed by at least one of a server (e.g., the server 501) and a processor of the server (e.g., the processor 1440).

In operation 1610, the server 1406 may respectively receive sensing information related to the state of at least one machine tool (e.g., the machine tools 400-1 through 400-n, 400a-1 through 400a-1, 400b-1 through 400b-m, or 400c-1 through 400c-n illustrated in FIG. 4 or the machine tool 500 illustrated in FIG. 5) respectively connected to a plurality of external electronic devices (e.g., the electronic devices 401-1 through 401-n, 401a, 401b, 401c illustrated in FIG. 4 or the electronic device 501 illustrated in FIG. 5.

For example, the plurality of external electronic devices may detect the sensing information related to the state of the at least one machine tool connected to each of the plurality of external electronic devices through at least one sensor included in each of the plurality of external electronic devices and may respectively transmit the detected sensing information to the server. In this way, the server may respectively receive the detected sensing information from the plurality of external electronic devices.

In operation 1620, for example, the server may generate reference information for determining the state related to the at least one machine tool connected to each of the plurality of external electronic devices based on the respectively received sensing information.

The respectively received sensing information may further include, for example, characteristic information of the at least one machine tool. The sensing information may have a different value according to characteristics of the at least one machine tool. For example, the sensing information may have a different value according to the type of the at least one machine tool, the type of a tool (e.g., a flat, a ball, a drill, etc.) or consumable (e.g., cutting oil, etc.) related to the machine tool, a processing portion, the type of processing target (e.g., metal, etc.), or the type of processing method (e.g., cutting, drilling, grinding, polishing, etc.). The respectively received sensing information may further include sensing information corresponding to the characteristic information of the at least one machine tool.

According to an embodiment, the server may classify the respectively received sensing information for each of the plurality of external electronic devices based on the characteristic information of the at least one machine tool, and may respectively generate reference information based on the sensing information for the classified characteristic information. The characteristic information of the at least one machine tool may include, for example, at least one of the type of the at least one machine tool, the type of tool or consumable related to the at least one machine tool, a processing portion, the type of processing target, the type of processing method, or a combination thereof.

According to an embodiment, the respectively received sensing information may include an SLM of the at least one machine tool.

In operation 1630, for example, the server may respectively transmit the reference information generated for each of the plurality of external electronic devices to the plurality of external electronic devices.

Figure 17:
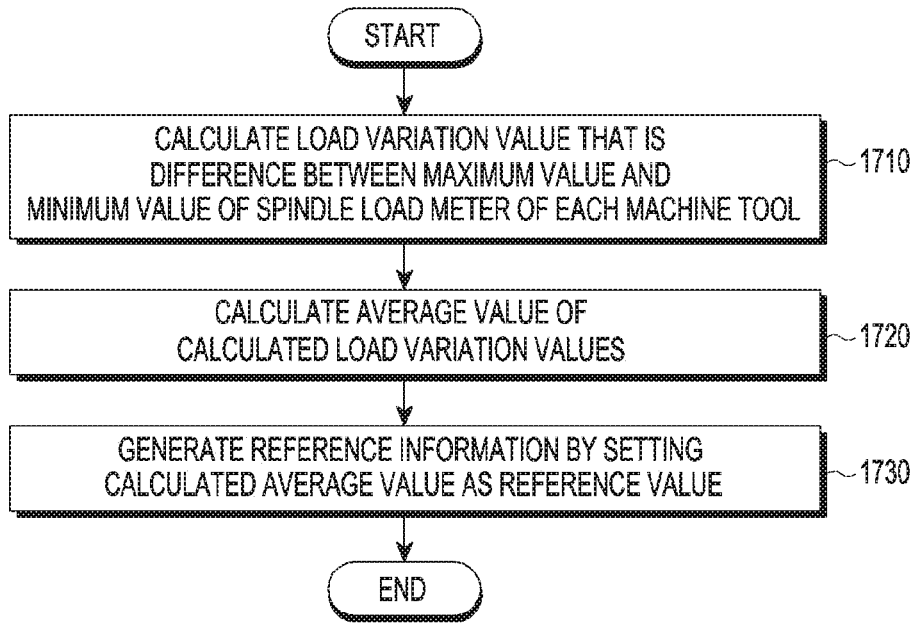
FIG. 17 is a flowchart illustrating a method for monitoring a state of a machine tool in a server according to various embodiments.

FIG. 17 is a flowchart illustrating a method for monitoring the state of a machine tool in a server according to various embodiments. FIG. 17 is a flowchart illustrating in detail operation 1620 illustrated in FIG. 16 in which the method for monitoring the state of the machine tool in the server may include operations 1710 through 1730. The method for monitoring the state of the machine tool in the server may be performed by at least one of a server (e.g., the server 501) and a processor of the server (e.g., the processor 1440). In the current embodiment, the respectively received sensing information is assumed to include an SLM of the at least one machine tool.

In operation 1710, for example, the server may respectively calculate a load variation value that is a difference between a maximum value and a minimum value of an SLM of each machine tool of the at least one machine tool.

In operation 1720, for example, the server may calculate an average value of the respectively calculated load variation values.

In operation 1730, for example, the server may generate the reference information by setting the calculated average value as a reference value for determining a state related to the at least one machine tool. For example, the server may set a state determination condition for determining the state related to the at least one machine tool by using the average value set as the reference value based on characteristic information of the machine tool. The server may generate the reference information including the set reference value and the state determination condition.

Figure 18:
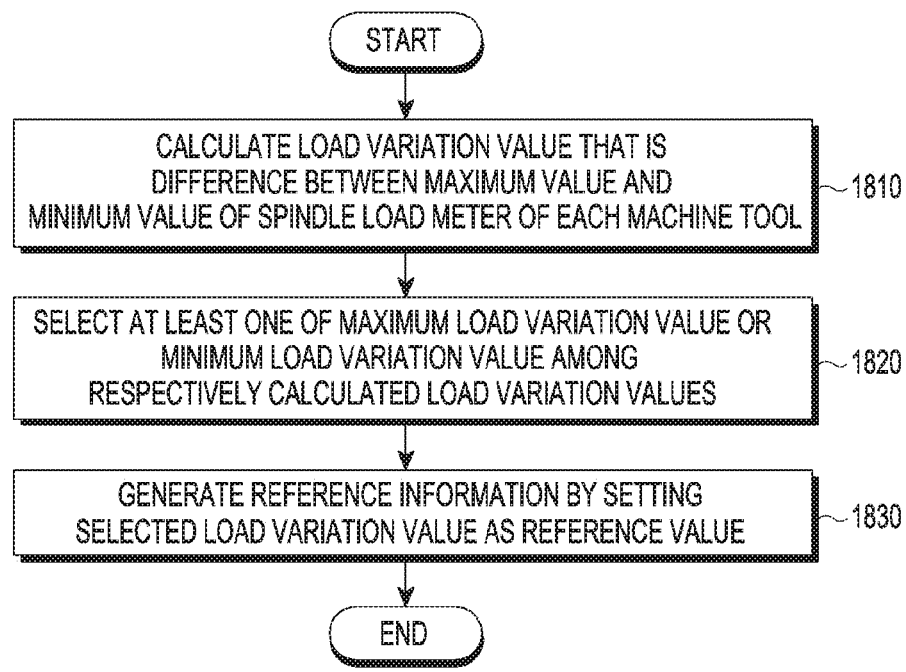
FIG. 18 is a flowchart illustrating a method for monitoring a state of a machine tool in a server according to various embodiments.

FIG. 18 is a flowchart illustrating a method for monitoring the state of a machine tool in a server according to various embodiments. FIG. 18 is a flowchart illustrating in detail operation 1620 illustrated in FIG. 16 in which the method for monitoring the state of the machine tool in the server may include operations 1810 through 1830. The method for monitoring the state of the machine tool in the server may be performed by at least one of a server (e.g., the server 501) and a processor of the server (e.g., the processor 1440). In the current embodiment, the respectively received sensing information is assumed to include an SLM of the at least one machine tool.

In operation 1810, for example, the server may respectively calculate a load variation value that is a difference between a maximum value and a minimum value of an SLM of each machine tool of the at least one machine tool.

In operation 1820, for example, the server may select at least one of a maximum load variation value or a minimum load variation value among the respectively calculated load variation values.

In operation 1830, for example, the server may generate the reference information by setting the selected load variation value as a reference value for determining a state related to the at least one machine tool. For example, the server may set a state determination condition for determining the state related to the at least one machine tool by using at least one of the maximum load variation value or the minimum load variation value that is set as the reference value based on characteristic information of the machine tool. The server may generate the reference information including the set reference value and the set state determination condition.

Figure 19:
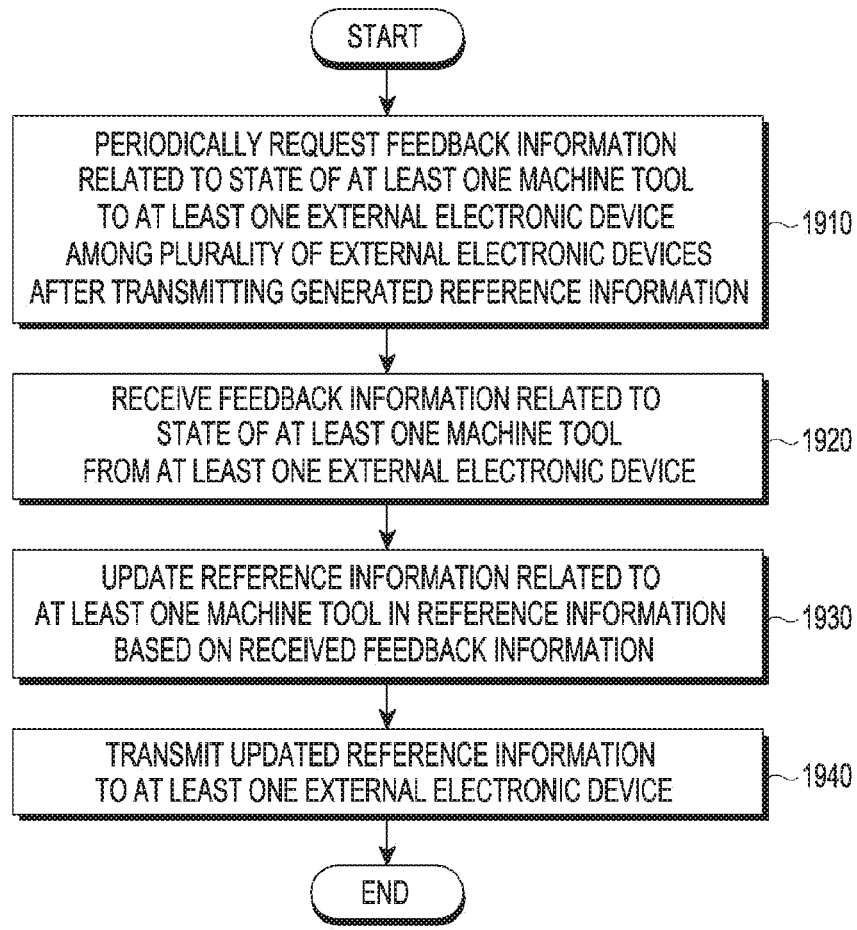
FIG. 19 is a flowchart illustrating a method for monitoring a state of a machine tool in a server according to various embodiments.

FIG. 19 is a flowchart illustrating a method for monitoring the state of a machine tool in a server according to various embodiments. A method for monitoring the state of a machine tool in the server may include operations 1910 through 1940. The method for monitoring the state of the machine tool in the server may be performed by at least one of a server (e.g., the server 501) and a processor of the server (e.g., the processor 1440).

In operation 1910, for example, the server may periodically send a feedback information request for feedback information related to state information of the at least one machine tool to at least one external electronic device among the plurality of external electronic devices.

In operation 1920, for example, the server may receive the feedback information related to the state information of the at least one machine tool from the at least one external electronic device.

In operation 1930, for example, the server may update reference information related to the at least one machine tool in the reference information based on the received feedback information.

In operation 1940, for example, the server may transmit the updated reference information to the at least one external electronic device.

The server may periodically or aperiodically repeat operations 1910 through 1940, and by doing so, the server may monitor the state of the at least one machine tool respectively connected to the plurality of electronic devices and update the reference information by organically and periodically reflecting the reference information in the state change of the at least one machine tool. As the reference information is updated, the accuracy of determining the state of the at least one machine tool may be improved.

A term "module" used herein may mean, for example, a unit including one of or a combination of two or more of hardware, software, and firmware. The "module" may be interchangeably used with a unit, a logic, a logical block, a component, or a circuit. The "module" may be a minimum unit or a portion of an integrated component. The "module" may be a minimum unit or part thereof, adapted to perform one or more functions. The "module" may be implemented mechanically or electronically. For example, the "module" according to the embodiments may include at least one of an application-specific integrated circuit (ASIC) chip, field-programmable gate arrays (FPGAs), and a programmable-logic device performing certain operations already known or to be developed.

At least a part of an apparatus (e.g., modules or functions thereof) or a method (e.g., operations) according to various embodiments may be implemented with instructions stored in a computer-readable storage medium in the form of a programming module. When the instructions are executed by one or more processors (for example, the processor 120), the one or more processors may perform functions corresponding to the instructions. The computer-readable storage medium may be, for example, a memory included in the memory 130.

The computer readable recording medium may include a hard disk, a floppy disk, or magnetic media (e.g., a magnetic tape, optical media (e.g., compact disc read only memory (CD-ROM) or digital versatile disc (DVD), magneto-optical media (e.g., floptical disk), a hardware device (e.g., ROM, RAM, flash memory, etc.), and so forth. Further, the program instructions may include a machine language code created by a complier and a high-level language code executable by a computer using an interpreter. The foregoing hardware device may be configured to be operated as at least one software module to perform an operation of the present disclosure, or vice versa.

Modules or programming modules according to various embodiments of the present disclosure may include one or more of the foregoing elements, have some of the foregoing elements omitted, or further include additional other elements. Operations performed by the modules, the programming modules or other elements according to various embodiments may be executed in a sequential, parallel, repetitive or heuristic manner. Also, some of the operations may be executed in different order or omitted, or may have additional different operations.

According to various embodiments, a storage medium have recorded therein instructions that, when executed by at least one processor, cause the at least one processor to perform at least one operation including detecting first sensing information related to a state of at least one machine tool connected to the processor, transmitting the detected first sensing information to a server, receiving from the server, reference information obtained based on the detected first sensing information and second sensing information related to a state of at least one external machine tool connected to at least one external electronic device, and determining the state related to the at least one machine tool based on the received reference information.

The embodiments disclosed herein have been provided for description and understanding of disclosed technical matters, and are not intended to limit the scope of the present disclosure. Therefore, it should be construed that the scope of the present disclosure includes any change or other various embodiments based on the technical spirit of the present disclosure.

The invention claimed is:

1. An electronic device comprising:
a communication circuit;
at least one sensor configured to detect first sensing information related to a state of at least one machine tool connected to the electronic device; and
a processor configured to:
transmit the detected first sensing information to a server,
receive from the server, reference information obtained based on the first sensing information and second sensing information related to a state of at least one external machine tool connected to at least one external electronic device,
determine a state related to the at least one machine tool based on the received reference information,
generate feedback information comprising a result of a determination related to the state of the at least one machine tool,
transmit the generated feedback information to the server, and
receive reference information updated based on the feedback information from the server,
wherein the processor is further configured to detect the first sensing information related to the state of the at least one machine tool after receiving the reference information, identify characteristic information related to the at least one machine tool, and determine the state related to the at least one machine tool by comparing the reference information with the detected first sensing information based on the identified characteristic information.

2. The electronic device of claim 1, wherein the processor is further configured to obtain reference information corresponding to the identified characteristic information from the reference information, determine whether a result of comparing the obtained reference information with the detected first sensing information satisfies a preset condition, determine the state related to the at least one machine tool to be normal when the result of comparison satisfies the preset condition, and determine the state related to the at least one machine tool to be abnormal when the result of comparison does not satisfy the preset condition.

3. The electronic device of claim 2, wherein the processor is further configured to notify at least one of an abnormal state of the at least one machine tool, a damage/abrasion of a tool related to the at least one machine tool, absence of a consumable related to the at least one machine tool, or a combination thereof, when determining the state related to the at least one machine tool to be abnormal.

4. The electronic device of claim 1, wherein the first sensing information related to the state of the at least one machine tool comprises a spindle load meter (SLM).

5. The electronic device of claim 4, wherein the reference information comprises at least one of a maximum load variation value and a minimum load variation value among load variation values of SLMs of the at least machine tool, an average value of the load variation values, or a combination thereof.

6. The electronic device of claim 5, wherein the processor is further configured to:
   determine whether a load variation value of the detected SLM is less than the maximum load variation value when the reference information is set to the maximum load variation value;
   determine a state related to a machine tool to be normal when the load variation value of the detected SLM is less than the maximum load variation value; and
   determine the state related to the machine tool to be abnormal when the load variation value of the detected SLM is greater than or equal to the maximum load variation value.

7. The electronic device of claim 5, wherein the processor is further configured to:
   determine whether a load variation value of the detected SLM is greater than or equal to the minimum load variation value when the reference information is set to the minimum load variation value;
   determine a state related to a machine tool to be normal when the load variation value of the detected SLM is greater than or equal to the minimum load variation value; and
   determine the state related to the machine tool to be abnormal when the load variation value of the detected SLM is less than the minimum load variation value.

8. The electronic device of claim 5, wherein the processor is further configured to:
   when the reference information is set to the minimum load variation value and the maximum load variation value, determine whether the load variation value of the detected SLM is greater than or equal to the minimum load variation value and is less than the maximum load variation value;
   when the load variation value of the detected SLM is greater than or equal to the minimum load variation value and is less than the maximum load variation value, determine a state related to a machine tool to be normal; and
   when the load variation value of the detected SLM is less than the minimum load variation value or is greater than or equal to the maximum load variation value, determine the state related to the machine tool to be abnormal.

9. The electronic device of claim 1, wherein the processor is further configured to update the reference information based on a result of determining a state related to the at least one machine tool.

10. A method for monitoring a state of a machine tool in an electronic device, the method comprising:
    detecting first sensing information related to a state of at least one machine tool connected to the electronic device;
    transmitting the detected first sensing information to a server;
    receiving from the server, reference information obtained based on the detected first sensing information and second sensing information related to a state of at least one external machine tool connected to at least one external electronic device;
    determining the state related to the at least one machine tool based on the received reference information;
    generating the feedback information comprising a result of determination related to the state of the at least one machine tool;
    transmitting the generated feedback information to the server; and
    receiving reference information updated based on the feedback information from the server,
    wherein the determining of the state related to the at least one machine tool comprises:
    detecting the first sensing information related to a state of the at least one machine tool after receiving the reference information;
    identifying characteristic information related to the at least one machine tool; and
    determining the state related to the at least one machine tool by comparing the reference information with the detected first sensing information based on the identified characteristics information.

11. The method of claim 10, wherein the determining of the state related to the at least one machine tool comprises:
    obtaining reference information corresponding to the identified characteristic information from the reference information;
    determining whether a result of comparing the obtained reference information with the detected first sensing information satisfies a preset condition; and
    determining the state related to the at least one machine tool to be normal when the result of comparison satisfies the preset condition and determining the state related to the at least one machine tool to be abnormal when the result of comparison does not satisfy the preset condition.

* * * * *